US012566557B2

(12) United States Patent
Vogelsang et al.

(10) Patent No.: US 12,566,557 B2
(45) Date of Patent: Mar. 3, 2026

(54) DRAM REFRESH CONTROL WITH MASTER WORDLINE GRANULARITY OF REFRESH INTERVALS

(71) Applicant: Rambus Inc., San Jose, CA (US)

(72) Inventors: Thomas Vogelsang, Mountain View, CA (US); Torsten Partsch, San Jose, CA (US); Brent Steven Haukness, Sunnyvale, CA (US); John Eric Linstadt, Palo Alto, CA (US)

(73) Assignee: Rambus Inc., San Jose, CA (US)

( * ) Notice: Subject to any disclaimer, the term of this patent is extended or adjusted under 35 U.S.C. 154(b) by 12 days.

(21) Appl. No.: 18/569,518

(22) PCT Filed: Jun. 21, 2022

(86) PCT No.: PCT/US2022/034350
§ 371 (c)(1),
(2) Date: Dec. 12, 2023

(87) PCT Pub. No.: WO2023/278204
PCT Pub. Date: Jan. 5, 2023

(65) Prior Publication Data
US 2024/0281154 A1 Aug. 22, 2024

Related U.S. Application Data

(60) Provisional application No. 63/220,210, filed on Jul. 9, 2021, provisional application No. 63/216,746, filed on Jun. 30, 2021.

(51) Int. Cl.
*G06F 3/06* (2006.01)
(52) U.S. Cl.
CPC .......... *G06F 3/0625* (2013.01); *G06F 3/0659* (2013.01); *G06F 3/0673* (2013.01)

(58) Field of Classification Search
CPC .... G06F 3/0625; G06F 3/0659; G06F 3/0673; G11C 11/40618; G11C 11/40622
See application file for complete search history.

(56) References Cited

U.S. PATENT DOCUMENTS

| | | | |
|---|---|---|---|
| 7,444,577 | B2 | 10/2008 | Best et al. |
| 7,565,479 | B2 | 7/2009 | Best et al. |

(Continued)

FOREIGN PATENT DOCUMENTS

| | | |
|---|---|---|
| WO | 2021-126541 A1 | 6/2021 |

OTHER PUBLICATIONS

Mathew, Deepak M., et al. "Using run-time reverse-engineering to optimize DRAM refresh." Proceedings of the International Symposium on Memory Systems. 2017. (Year: 2017).*

(Continued)

*Primary Examiner* — Nicholas J Simonetti
(74) *Attorney, Agent, or Firm* — The Neudeck Law Firm, LLC

(57) ABSTRACT

DRAM cells need to be periodically refreshed to preserve the charge stored in them. The retention time is typically not the same for all DRAM cells but follows a distribution with multiple orders of magnitude difference between the retention time of cells with the highest charge loss and the cells with the lowest charge loss. Different refresh intervals are used for certain wordlines based on the required minimum retention time of the cells on those wordlines. The memory controller does not keep track of refresh addresses. After initialization of the DRAM devices, the memory controller issues a smaller number of refresh commands when compared to refreshing all wordlines at the same refresh interval.

20 Claims, 20 Drawing Sheets

(56) References Cited

U.S. PATENT DOCUMENTS

| | | | |
|---|---|---|---|
| 7,734,866 B2 | 6/2010 | Tsern | |
| 7,898,892 B2 | 3/2011 | Klein | |
| 8,630,141 B2 | 1/2014 | Tamlyn | |
| 9,025,405 B2 | 5/2015 | Jeong | |
| 9,129,702 B2 | 9/2015 | Kim et al. | |
| 9,646,672 B1 | 5/2017 | Kim et al. | |
| 9,653,140 B2 | 5/2017 | Kim et al. | |
| 9,805,782 B1 | 10/2017 | Liou | |
| 2007/0076504 A1* | 4/2007 | Suh | G11C 11/40618 |
| | | | 365/222 |
| 2008/0130394 A1 | 6/2008 | Dono et al. | |
| 2013/0282973 A1* | 10/2013 | Kim | G11C 11/40615 |
| | | | 711/106 |
| 2014/0112086 A1* | 4/2014 | Park | G11C 11/40618 |
| | | | 365/222 |
| 2017/0287548 A1* | 10/2017 | Ishikawa | G11C 11/40615 |
| 2018/0019034 A1 | 1/2018 | Tsang | |
| 2018/0061476 A1 | 3/2018 | Kim | |
| 2018/0190340 A1 | 7/2018 | Kim et al. | |
| 2020/0211632 A1* | 7/2020 | Noguchi | G11C 11/40611 |
| 2020/0321049 A1* | 10/2020 | Meier | G11C 11/408 |
| 2021/0118491 A1* | 4/2021 | Li | G11C 29/20 |
| 2021/0241822 A1 | 8/2021 | Vogelsang | |
| 2022/0137843 A1 | 5/2022 | Vogelsang et al. | |
| 2022/0179556 A1 | 6/2022 | Miller et al. | |

OTHER PUBLICATIONS

Vakil Ghahani, Seyed Armin, Mahmut Taylan Kandemir, and Jagadish B. Kotra. "DSM: A case for hardware-assisted merging of DRAM rows with same content." Proceedings of the ACM on Measurement and Analysis of Computing Systems 4.2 (2020): 1-26. ( Year: 2020).*

Lu, Nicky et al., "Enhance Core Circuits for Scaling DRAM: 0.7V VCC with Long Retention 138ms at 125degreesC and Random Row/col. Access Times Accelerated by 1.5ns", 2021 Symposia on VLSI Technology Circuits, Kyoto. 28 pages.

Notification of Transmittal of the international Search Report and the Written Opinion of the International Searching Authority, or the Declaration with Mail Date Jan. 10, 2023 re: Int'l Appln. No. PCT/US2022/034350. 16 pages.

EP Extended European Search Report with Mail Date Mar. 31, 2025 re: EP Appln. No. 22833922.2. 11 pages.

* cited by examiner

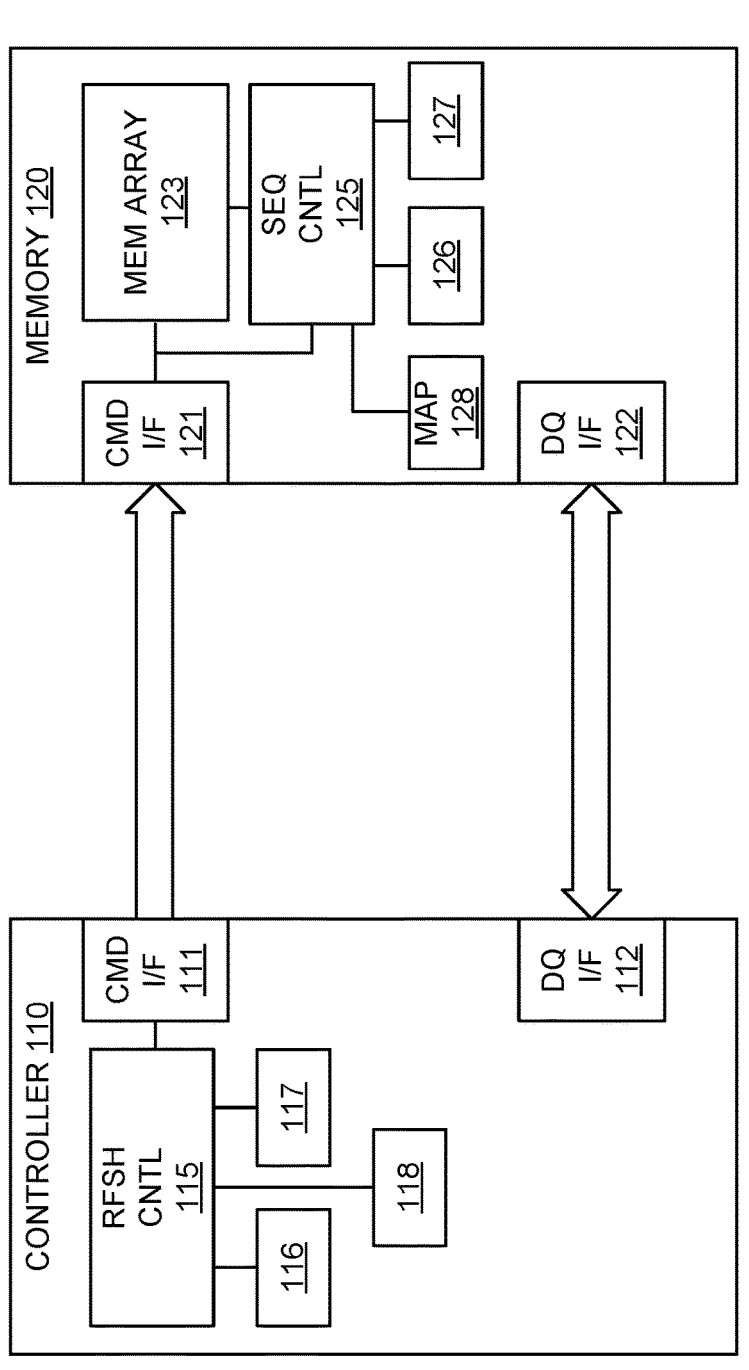
*FIG. 1*

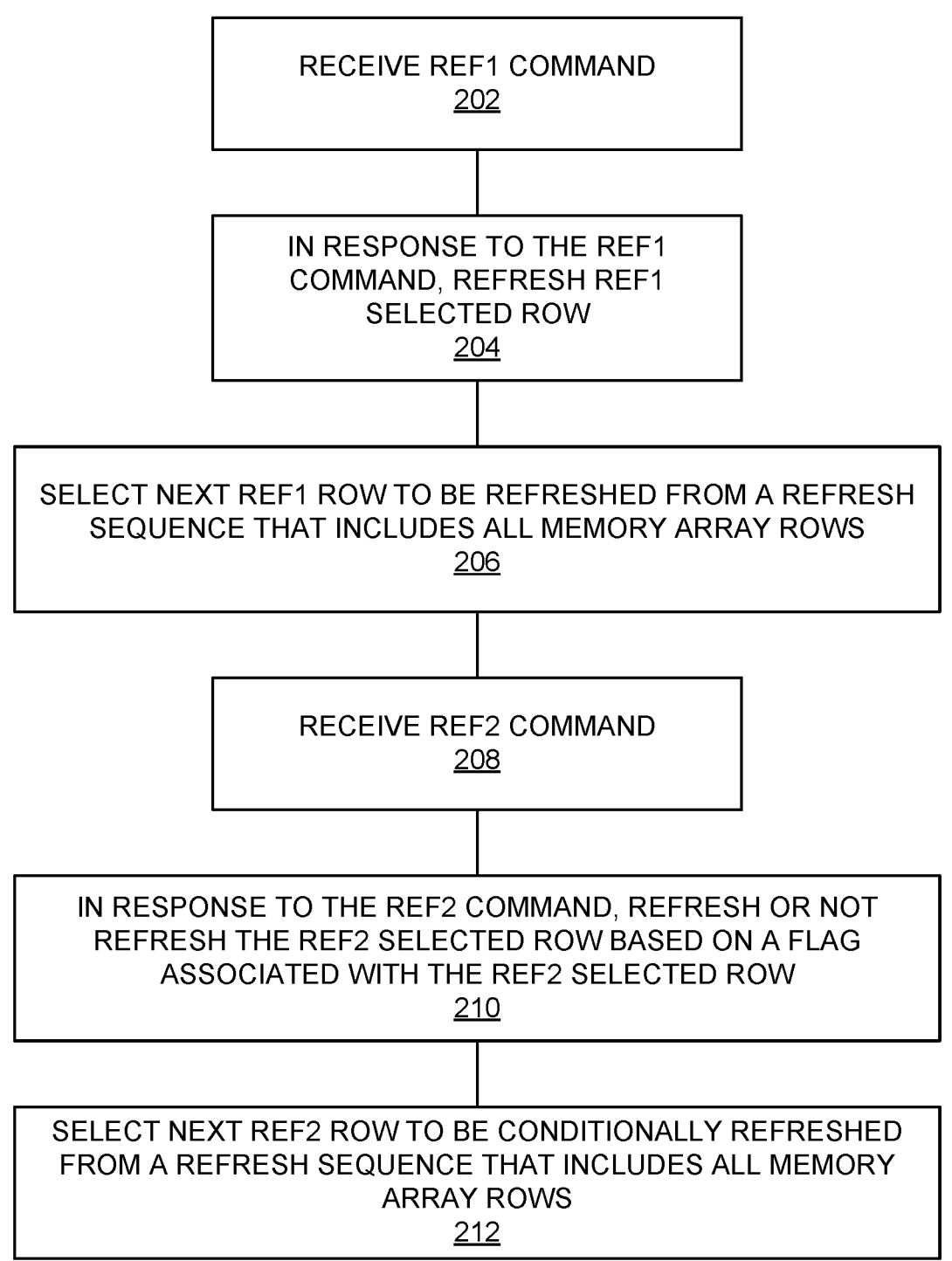

RECEIVE REF1 COMMAND
202

IN RESPONSE TO THE REF1
COMMAND, REFRESH REF1
SELECTED ROW
204

SELECT NEXT REF1 ROW TO BE REFRESHED FROM A REFRESH
SEQUENCE THAT INCLUDES ALL MEMORY ARRAY ROWS
206

RECEIVE REF2 COMMAND
208

IN RESPONSE TO THE REF2 COMMAND, REFRESH OR NOT
REFRESH THE REF2 SELECTED ROW BASED ON A FLAG
ASSOCIATED WITH THE REF2 SELECTED ROW
210

SELECT NEXT REF2 ROW TO BE CONDITIONALLY REFRESHED
FROM A REFRESH SEQUENCE THAT INCLUDES ALL MEMORY
ARRAY ROWS
212

*FIG. 2A*

RECEIVE REF1 COMMAND
302

IN RESPONSE TO THE REF1
COMMAND, REFRESH REF1
SELECTED ROW
304

SELECT NEXT REF1 ROW TO BE REFRESHED FROM A REFRESH
SEQUENCE THAT INCLUDES ALL MEMORY ARRAY ROWS
306

RECEIVE REF2 COMMAND
308

IN RESPONSE TO THE REF2
COMMAND, REFRESH THE REF2
SELECTED ROW
310

SELECT NEXT REF2 ROW TO BE REFRESHED FROM A REFRESH
SEQUENCE THAT DOES NOT INCLUDE ALL MEMORY ARRAY
ROWS
312

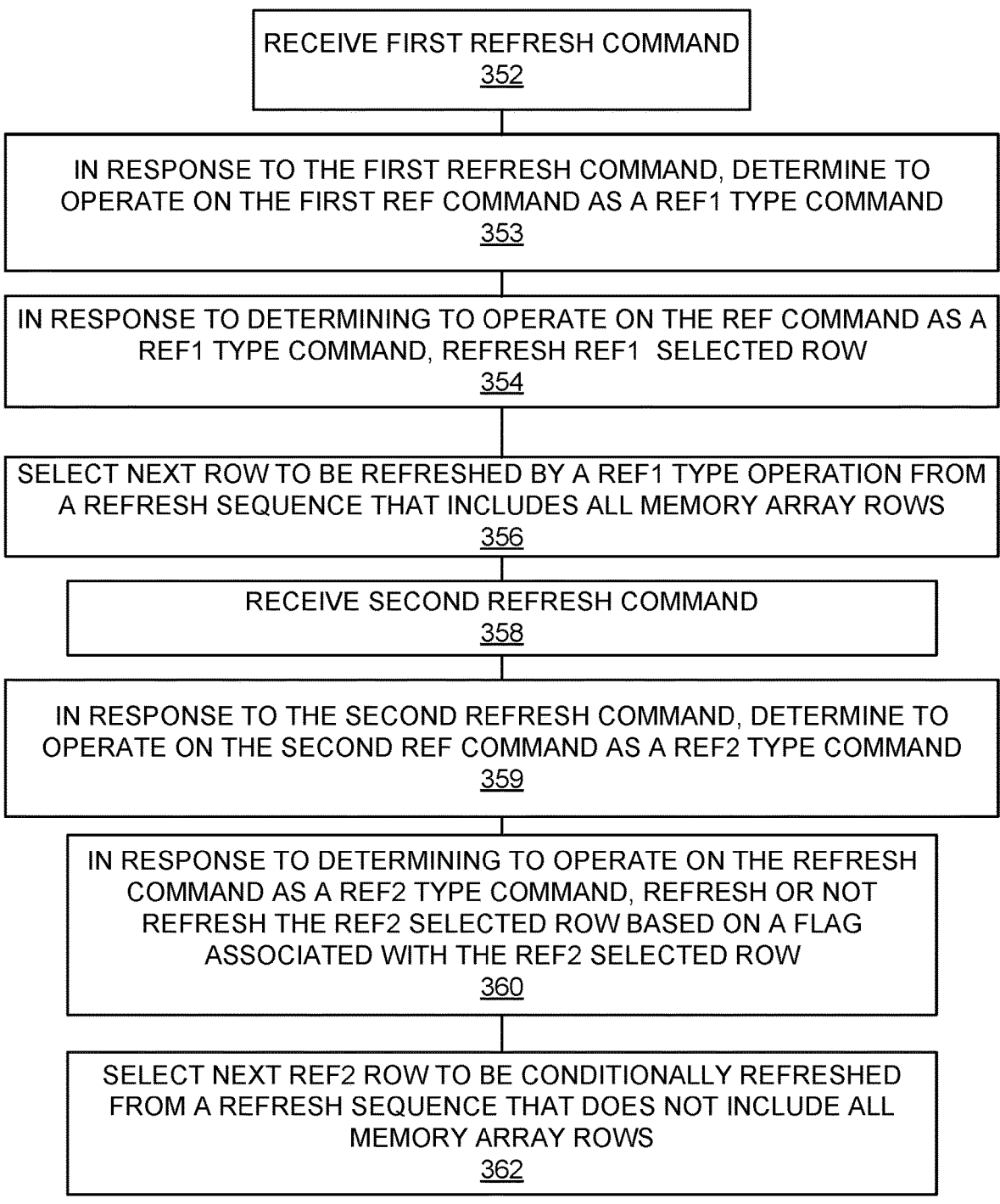

RECEIVE FIRST REFRESH COMMAND
352

IN RESPONSE TO THE FIRST REFRESH COMMAND, DETERMINE TO OPERATE ON THE FIRST REF COMMAND AS A REF1 TYPE COMMAND
353

IN RESPONSE TO DETERMINING TO OPERATE ON THE REF COMMAND AS A REF1 TYPE COMMAND, REFRESH REF1 SELECTED ROW
354

SELECT NEXT ROW TO BE REFRESHED BY A REF1 TYPE OPERATION FROM A REFRESH SEQUENCE THAT INCLUDES ALL MEMORY ARRAY ROWS
356

RECEIVE SECOND REFRESH COMMAND
358

IN RESPONSE TO THE SECOND REFRESH COMMAND, DETERMINE TO OPERATE ON THE SECOND REF COMMAND AS A REF2 TYPE COMMAND
359

IN RESPONSE TO DETERMINING TO OPERATE ON THE REFRESH COMMAND AS A REF2 TYPE COMMAND, REFRESH OR NOT REFRESH THE REF2 SELECTED ROW BASED ON A FLAG ASSOCIATED WITH THE REF2 SELECTED ROW
360

SELECT NEXT REF2 ROW TO BE CONDITIONALLY REFRESHED FROM A REFRESH SEQUENCE THAT DOES NOT INCLUDE ALL MEMORY ARRAY ROWS
362

| LSB DCDR 435a | MWL DRVR 431a | MWL DRVR 431b | ... | MWL DRVR 431c | LSB DCDR 435b |
| | MWL FLAG 432a | MWL FLAG 432b | ... | MWL FLAG 432c | |

442

| | MSB DCDR 433a | MSB DCDR 433b | ... | MSB DCDR 433c | |

441

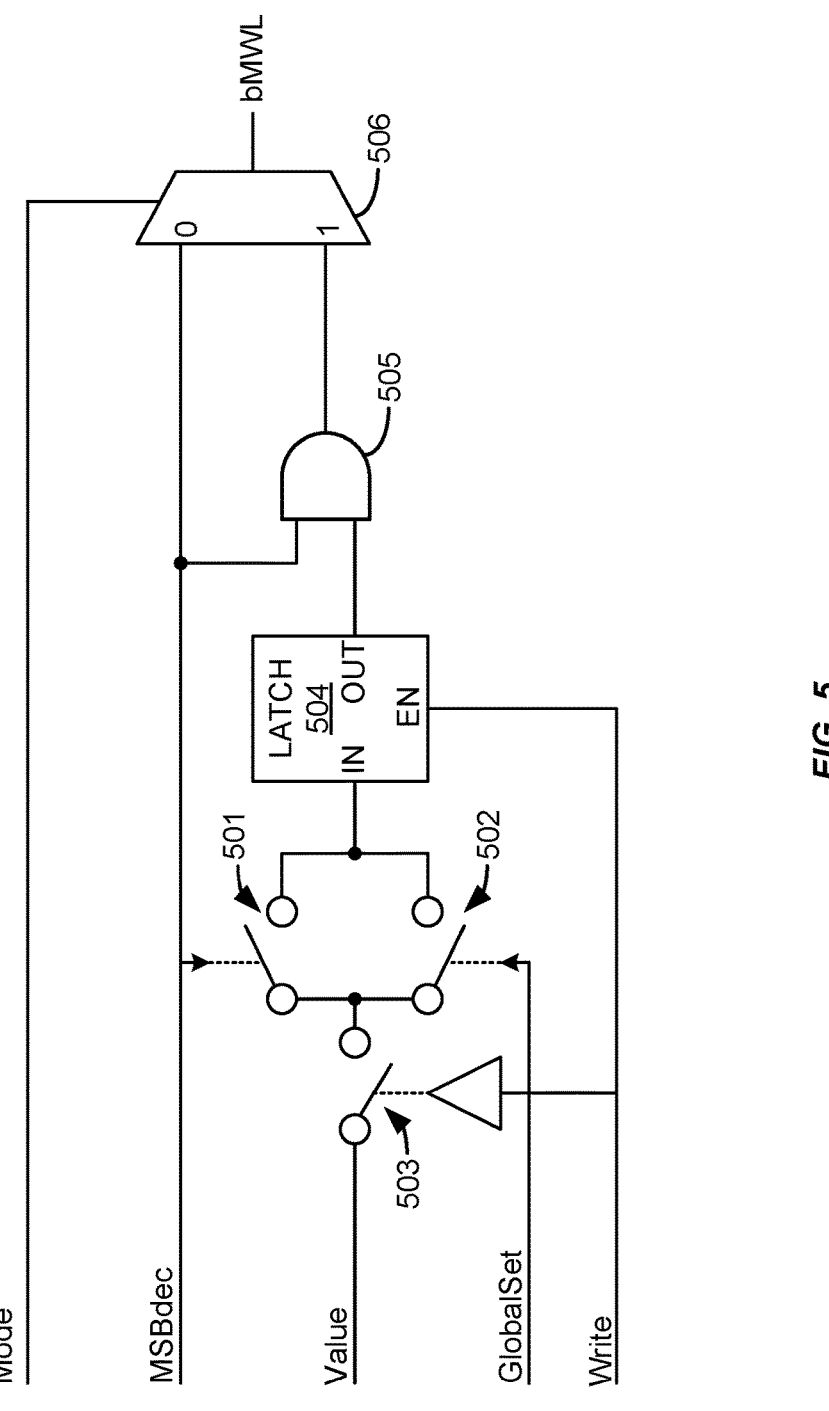
*FIG. 5*

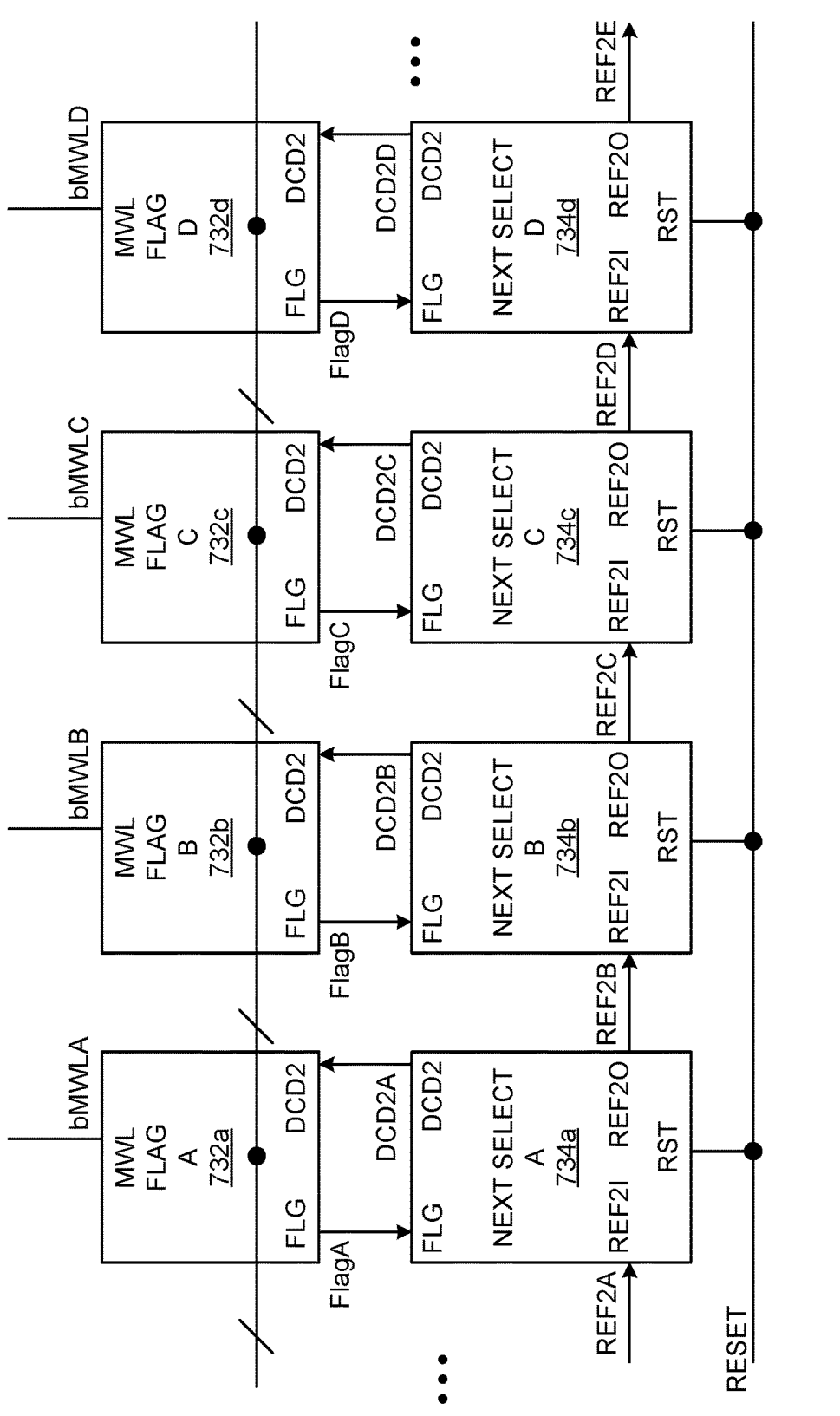
_FIG. 7_

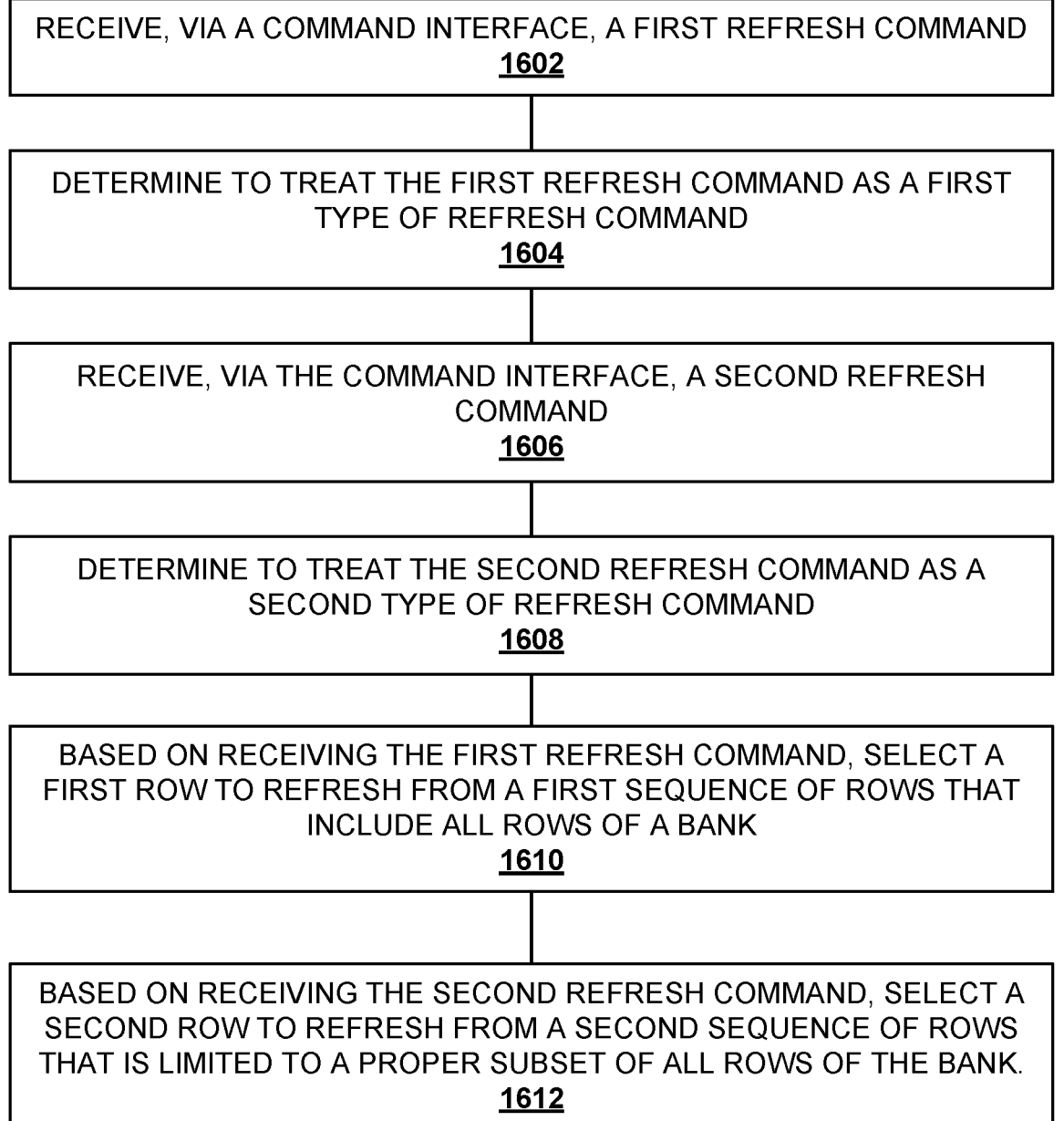

RECEIVE, VIA A COMMAND INTERFACE, A FIRST REFRESH COMMAND
1602

DETERMINE TO TREAT THE FIRST REFRESH COMMAND AS A FIRST TYPE OF REFRESH COMMAND
1604

RECEIVE, VIA THE COMMAND INTERFACE, A SECOND REFRESH COMMAND
1606

DETERMINE TO TREAT THE SECOND REFRESH COMMAND AS A SECOND TYPE OF REFRESH COMMAND
1608

BASED ON RECEIVING THE FIRST REFRESH COMMAND, SELECT A FIRST ROW TO REFRESH FROM A FIRST SEQUENCE OF ROWS THAT INCLUDE ALL ROWS OF A BANK
1610

BASED ON RECEIVING THE SECOND REFRESH COMMAND, SELECT A SECOND ROW TO REFRESH FROM A SECOND SEQUENCE OF ROWS THAT IS LIMITED TO A PROPER SUBSET OF ALL ROWS OF THE BANK.
1612

*FIG. 16*

DRAM REFRESH CONTROL WITH MASTER WORDLINE GRANULARITY OF REFRESH INTERVALS

BRIEF DESCRIPTION OF THE DRAWINGS

FIG. 1 is a block diagram illustrating a memory system.

FIG. 2A is a flowchart illustrating a power saving method of a refreshing dynamic random access memory (DRAM).

FIG. 3B is a flowchart illustrating a method of refreshing a DRAM.

FIG. 5 is a diagram illustrating flag-bit circuitry for refresh power savings.

FIG. 7 is a diagram illustrating the cascading of row circuitry for refresh command bandwidth savings.

FIG. 16 is a flowchart illustrating a method of operating a dynamic random access memory (DRAM) device.

DETAILED DESCRIPTION OF THE EMBODIMENTS

Figure 2B:
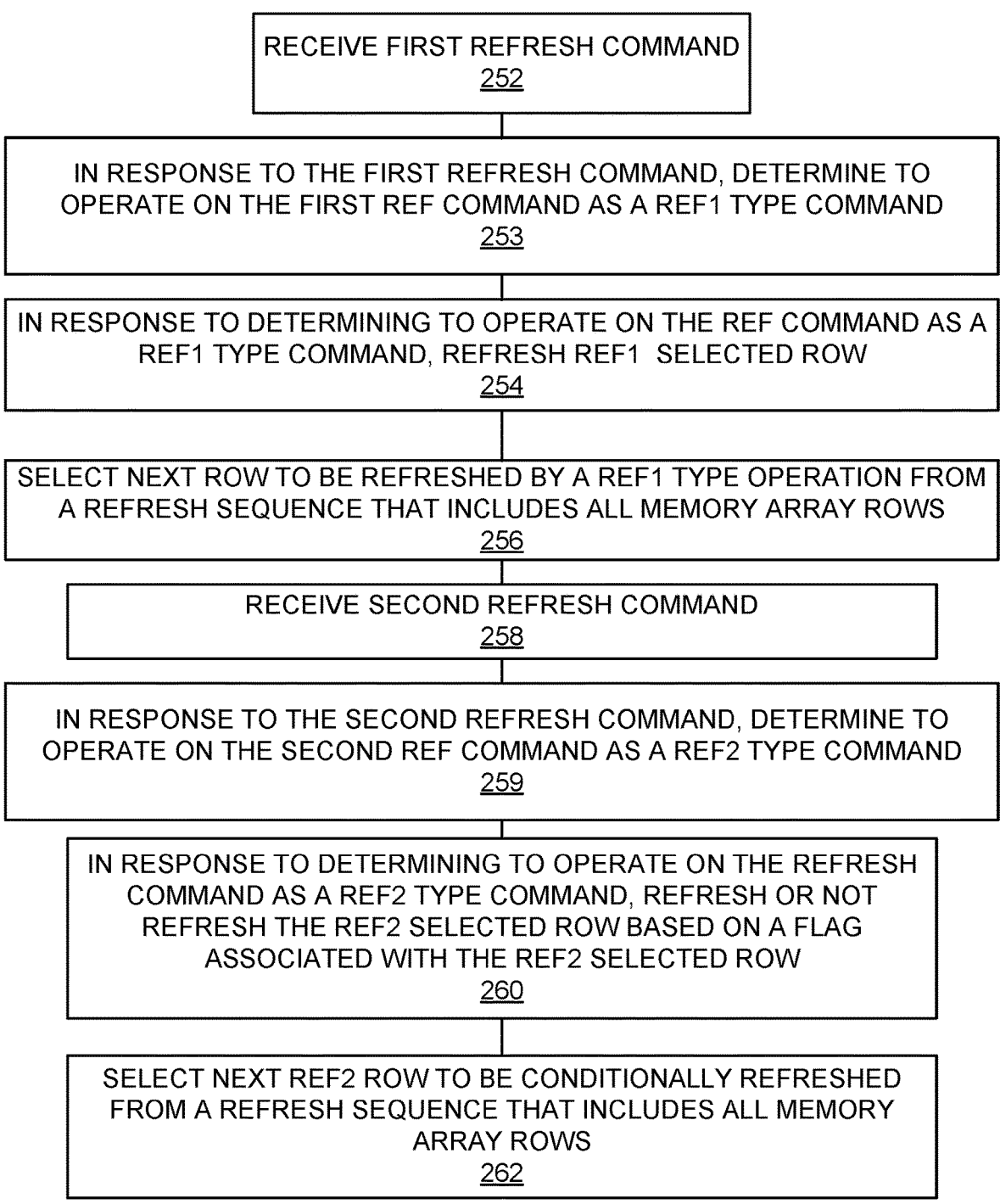
FIG. 2B is a flowchart illustrating a method of a refreshing dynamic random access memory (DRAM).

DRAM cells need to be periodically refreshed to preserve the charge stored in them. There are multiple mechanisms causing the loss of charge. These mechanisms also vary in strength. The retention time is therefore not the same for all DRAM cells but follows a distribution with multiple orders of magnitude difference between the retention time of cells with the highest charge loss and the cells with the lowest charge loss.

In an embodiment, different refresh intervals are used for certain wordlines based on the minimum retention time of the cells on those wordlines. The wordlines having a shorter minimum retention time, and thus require a shorter refresh interval, are referred to as "weak wordlines." The wordlines having a longer minimum retention time, when compared to the weak wordlines, and thus allowing for a longer refresh interval when compared to the weak wordlines refresh interval, are referred to as "strong wordlines." Refreshing the weak wordlines at a higher rate (shorter interval) than the strong wordlines which are refreshed at a relatively lower rate (longer interval) increases the effective refresh interval without loss of reliability. This also has effects of corresponding reductions in refresh energy consumption and command bandwidth. The method can be implemented with a moderate DRAM die size impact (e.g., between 1% and 2.5%). The memory controller does not keep track of refresh addresses. After initialization of the DRAM devices, the memory controller needs only to issue a smaller number of refresh commands when compared to refreshing all wordlines at the same refresh interval.

FIG. 1 is a block diagram illustrating a memory system. In FIG. 1, memory system 100 comprises controller 110 and memory device 120. Controller 110 includes command interface (e.g., command/address interface) 111, data (DQ) interface 112, refresh control 115, first refresh type (REF1) counter 116, second refresh type counter (REF2) 117, and total refresh counter 118. In an embodiment, counters 116 and 117 can be omitted. Memory device 120 includes command interface (e.g., command/address interface) 121, data (DQ) interface 122, memory array 123, refresh sequence control 125, first refresh type (REF1) counter 126, and second refresh type counter (REF2) 127, and map 128.

Controller 110 and memory device 120 may be integrated circuit type devices, such as are commonly referred to as a "chips". A memory controller, such as controller 110, manages the flow of data going to and from memory devices and/or memory modules. Memory device 120 (also referred to as a memory component 120) may be a standalone device, or may be a component of a memory module. Memory device 120 may be a device that adheres to, or is compatible with, a dynamic random access memory (DRAM) specification. A memory controller can be a separate, standalone chip, or integrated into another chip. For example, a memory controller 110 may be included on a single die with a microprocessor, included as a chip co-packaged with one or more microprocessor chips, included as part of a more complex integrated circuit system such as a block of a system on a chip (SOC), or be remotely coupled to one or more microprocessors via a fabric interconnect.

Command interface 111 of controller 110 is operatively coupled to command interface 121 of memory device 120. Command interface 111 is operatively coupled to command interface 121 to communicate commands from controller 110 to memory device 120. In an embodiment, the commands communicated from controller 110 to memory device 120 include at least two different types of refresh commands—referred to herein as REF1 and REF2. In an embodiment, commands communicated from controller 110 to memory device 120 may include a single type of refresh command—referred to herein as REF. In such an embodiment, each REF command communicated from controller 110 to memory device 120 is designated by memory device 120, (e.g., through a state machine, and/or control circuit in refresh sequence control 125) to be either a REF1 type or REF2 type command.

Controller 110 is operatively coupled to memory device 120 via DQ interface 112 and DQ interface 122. Controller 110 and memory device 120 are operatively coupled via DQ interface 112 and DQ interface 122 to bidirectionally communicate data. Memory device 120 may store (e.g., in memory array 123) and retrieve (e.g., from memory array 123) data communicated via DQ interface 112 and DQ interface 122. In an embodiment, DQ interface 112 and DQ interface 122 may communicate other information such as device select indicators and/or information to be stored in map 128 and/or read from map 128.

Command interface 121 of memory device 120 is operatively coupled to memory array 123 and refresh sequence control 125. Refresh sequence control 125 is operatively coupled to memory array 123, REF1 counter 126, REF2 counter 127, and map 128. Refresh sequence control 125 is operatively coupled to memory array 123 to at least refresh the rows (wordlines) of memory array 123. The sequence that rows of memory array 123 are refreshed is based at least in part on the REF1 commands received, REF2 commands received, the values of REF1 counter 126, values of REF2 counter 127, and values stored in map 128.

Refresh control 115 of controller 110 is operatively coupled to REF1 counter 116, REF2 counter 117, total refresh counter 118, and command interface 111. Refresh control 115 is operatively coupled to command interface 111 to at least send REF1 and REF2 commands to memory device 120. The rate and sequence of REF1 and REF2 commands that refresh control 115 issues memory device 120 is based at least in part on the values of REF1 counter 116 and REF2 counter 117. In an embodiment when controller 110 issues REF commands rather than specifying REF1 and REF2 type commands, the rate and sequence of REF commands is based at least in part on the values of total refresh counter 118.

In an embodiment, memory device 120 stores at least one bit per group of neighboring wordlines. Refresh sequence control 125 then refreshes a group of wordlines more often if the stored bit in map 128 associated with the group is set than when the bit is not set. Thus, memory device 120 has two refresh periods, a long and a short one.

In an embodiment, map 128 of memory device 120 includes one flag bit per one or two master wordline (MWL) decoders and drivers for a group size of four or eight. When memory device receives a REF1 command from controller 110, or determines that a REF command received from controller 110 is to be operated upon as a REF1 type command, memory device 120 (and sequence control 125, in particular) refreshes wordlines of memory array 123 independent of the status of the flag bits associated with the wordlines. When memory device receives a REF2 command from controller 110 or determines that a REF command received from controller 110 is to be operated upon as a REF2 type command, memory device 120 (and sequence control 125, in particular) refreshes only wordlines where the associated flag bit has been set in map 128. Thus, if there are m−1 REF2 commands issued per REF1 command, then wordlines with the associated flag bit set in map 128 will be refreshed m times more often than wordlines with the flag bit not set in map 128. In an embodiment, the ratio of a long refresh period to a short refresh period is m.

In an embodiment where the reduction of refresh power is desired, sequence control 125 ignores the associated flag bit stored in map 128 when a REF1 command is received and bases a decision whether to refresh a MWL group on at least the associated flag bit when a REF2 command is received. Memory device 120 includes circuitry (not shown in FIG. 1) to set the flags bits, either globally or based on the row address, in map 128. In an embodiment, map 128 is stored in row decoder/driver circuitry. In several embodiments, the row address to be refreshed may be supplied by the regular REF1 refresh counter 126, REF2 refresh counter 127, or both.

In an embodiment where it is desired to reduce command bandwidth (e.g., reducing the number of commands communicated via command interface 111 and command interface 121) REF1 refresh counter 126 and REF2 refresh counter 127 operate independently or semi-independently. For example, memory device 120 receiving a REF1 command may result in the value in the REF1 refresh counter 126 being stepped (e.g., incremented or decremented) but does not affect the value in the REF2 refresh counter 127. Likewise, memory device 120 receiving a REF2 command may result in the value in the REF2 refresh counter 127 being stepped to the next row having an associated flag bit in map 128 set, but does not affect the value in the REF1 refresh counter 126. However, in an example of semi-independent operation, REF1 counter 126 reaching a limit value (e.g., maximum, minimum, number of rows, etc.) may reset both REF1 refresh counter 126 and REF2 refresh counter 127 to an initial value or state. In an embodiment, the initial values or states of REF1 refresh counter 126 and REF2 refresh counter 127 are not equal and/or do not point to the same row. In an embodiment, REF1 refresh counter 126 and REF2 refresh counter 127 are initialized to be separated by a substantial number of rows (e.g., approximately ½ the total number of rows plus or minus 5%, 10% or 20%).

FIG. 2A is a flowchart illustrating a power saving method of a refreshing dynamic random access memory (DRAM). One or more of the steps illustrated in FIG. 2A may be performed by, for example, memory system 100, and/or its components. A first type of refresh command (REF1) is received (202). For example, memory device 120 may receive, via command interface 121, a REF1 command transmitted by controller 110 via command interface 111. In another example, memory device 120 may receive, via command interface 121, a REF command transmitted by controller 110 via command interface 111 and determine that it is to be operated upon as a REF1 type command.

In response to the first type of refresh command (REF1), a REF1 selected row is refreshed (204). For example, in response to the received REF1 (or REF command to be treated as a REF1 command) command, memory device 120 may refresh the row in memory array 123 that corresponds to (e.g., pointed to) the value of REF1 refresh counter 126. A next row to be refreshed by the first type of refresh command (REF1) is selected from a sequence that includes all memory array rows (206). For example, for each REF1 command received, refresh sequence control 125 may step REF1 refresh counter 126 to a next value until REF1 refresh counter 126 has refreshed every row in memory array 123 whereupon refresh sequence control 125 sets refresh counter 126 back to an initial value and repeats the sequence as additional REF1 commands (or REF command to be treated as REF1 commands) are received.

A second type of refresh command (REF2) is received (208). For example, memory device 120 may receive, via command interface 121, a REF2 command transmitted by controller 110 via command interface 111. In another example, memory device 120 may receive, via command interface 121, a REF command transmitted by controller 110 via command interface 111 and determine that it is to be operated upon as a REF2 type command. In response to the second type of refresh command (REF2), a REF2 selected row is either refreshed or not refreshed based on a flag associated with the REF2 selected row (210). For example, in response to the received REF2 command (or REF command to be treated as a REF2 command), memory device 120 may, based on the value of the flag in map 128 associated with the row in memory array 123 that corresponds to (e.g., pointed to) the value of REF2 refresh counter 127, either refresh or not refresh that row.

A next row to be conditionally refreshed by the second type of refresh command (REF2) is selected from a sequence that includes all memory array rows (212). For example, for each REF2 command received (or REF command to be treated as a REF2 command), refresh sequence control 125 may step REF2 refresh counter 127 to a next value until REF2 refresh counter 126 has considered every row in memory array 123 for a refresh whereupon refresh sequence control 125 sets refresh counter 127 back to an initial value and repeats the sequence as additional REF2 commands (or REF commands to be treated as REF2 commands) are received.

FIG. 2B is a flowchart illustrating a method of a refreshing dynamic random access memory (DRAM). One or more of the steps illustrated in FIG. 2B may be performed by, for example, memory system 100, and/or its components. A first refresh command is received (252). For example, memory device 120 may receive, via command interface 121, a first REF memory device 120 may receive, via command interface 121, a REF1 command transmitted by controller 110 via command interface 111.

In response to the first refresh command, it is determined to operate on the first refresh command as a first type of refresh command (253). For example, in response to the first REF command, memory device 120 may determine to operate on the first REF command as a REF1 command. In another example, memory device 120 may determine to operate on the first REF command as a REF1 command based at least in part on a decoding of the first REF command.

In response to determining to operate on the first refresh command as a REF1 command, a REF1 selected row is refreshed (254). For example, in response to the received REF command to be treated as a REF1 command, memory device 120 may refresh the row in memory array 123 that corresponds to (e.g., pointed to) the value of REF1 refresh counter 126. In another example, in response to decoding the received REF command as a REF1 command, memory device 120 may refresh the row in memory array 123 that corresponds to (e.g., pointed to) the value of REF1 refresh counter 126.

A next row to be refreshed by the first type of refresh operation is selected from a sequence that includes all memory array rows (256). For example, for each REF command that is treated or decoded as a REF1 command, refresh sequence control 125 may step REF1 refresh counter 126 to a next value until REF1 refresh counter 126 has refreshed every row in memory array 123 whereupon refresh sequence control 125 sets refresh counter 126 back to an initial value and repeats the sequence as additional REF commands to be treated as, or are decoded as, REF1 commands are received.

A second refresh command is received (258). For example, memory device 120 may receive, via command interface 121, a second REF command transmitted by controller 110 via command interface 111. In another example, memory device 120 may receive, via command interface 121, a REF2 command transmitted by controller 110 via command interface.

In response to the second refresh command, it is determined to operate on the second refresh command as a second type of refresh command (259). For example, in response to the second REF command, memory device 120 may determine to operate on the second REF command as a REF2 command. In another example, memory device 120 may determine to operate on the second REF command as a REF2 command based at least in part on a decoding of the second REF command.

In response to determining to operate on the second refresh as the second type of refresh command, a REF2 selected row is either refreshed or not refreshed based on a flag associated with the REF2 selected row (260). For example, in response to the received REF command to be treated as a REF2 command, memory device 120 may, based on the value of the flag in map 128 associated with the row in memory array 123 that corresponds to (e.g., pointed to) the value of REF2 refresh counter 127, either refresh or not refresh that row. In another example, in response to decoding the received REF command as a REF2 command, memory device 120 may, based on the value of the flag in map 128 associated with the row in memory array 123 that corresponds to (e.g., pointed to) the value of REF2 refresh counter 127, either refresh or not refresh that row.

A next row to be conditionally refreshed by the second type of refresh operation is selected from a sequence that includes all memory array rows (262). For example, for each REF command that is treated or decoded as a REF2 command), refresh sequence control 125 may step REF2 refresh counter 127 to a next value until REF2 refresh counter 127 has considered every row in memory array 123 for a refresh whereupon refresh sequence control 125 sets refresh counter 127 back to an initial value and repeats the sequence as additional REF commands to be treated as, or are decoded as, REF2 commands are received.

Figure 3A:
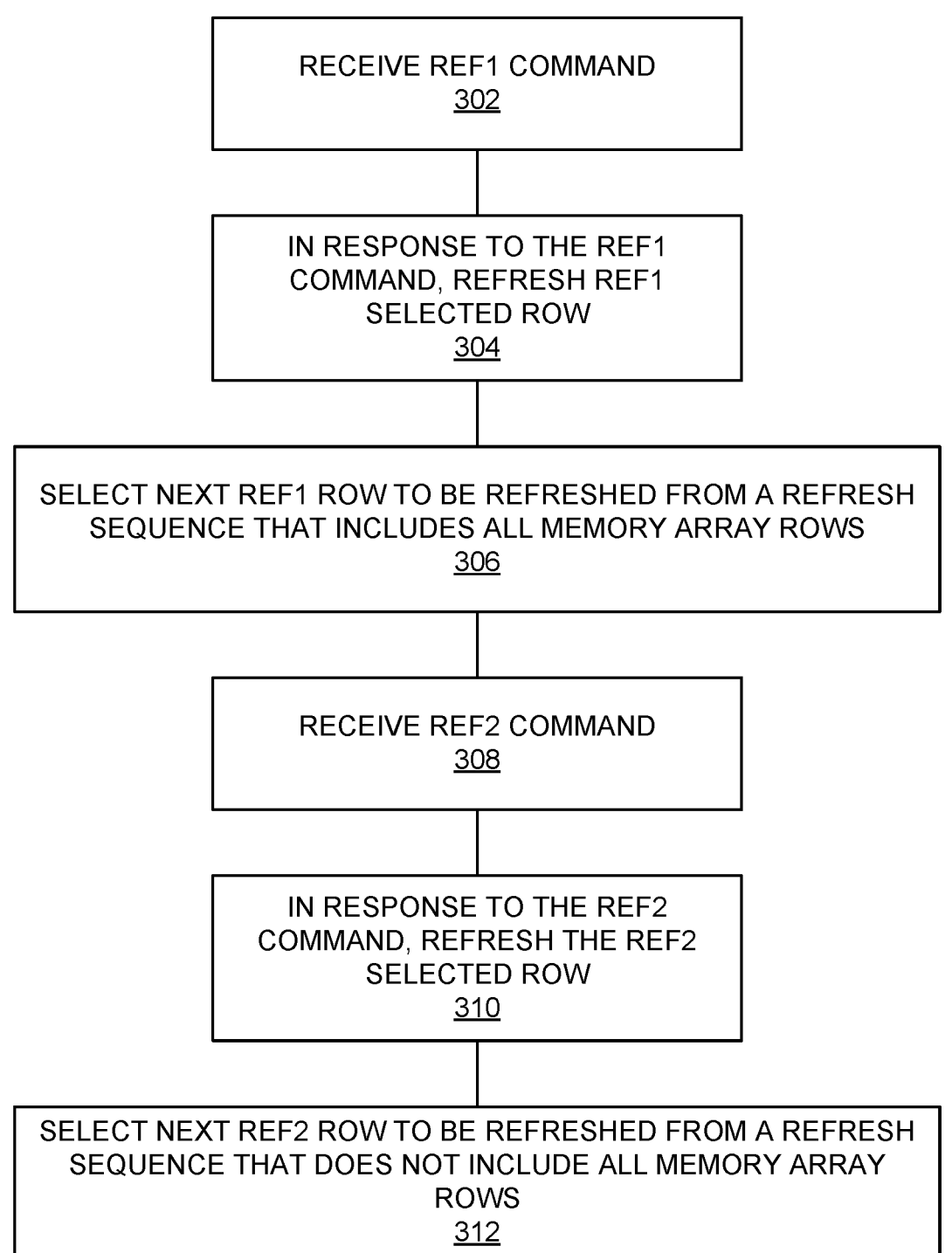
FIG. 3A is a flowchart illustrating a power and command bandwidth saving method of refreshing a DRAM.

FIG. 3A is a flowchart illustrating a power and command bandwidth saving method of refreshing a DRAM. One or more of the steps illustrated in FIG. 3A may be performed by, for example, memory system 100, and/or its components. A first type of refresh command (REF1) is received (302). For example, memory device 120 may receive, via command interface 121, a REF1 command transmitted by controller 110 via command interface 111. In another example, memory device 120 may receive, via command interface 121, a REF command transmitted by controller 110 via command interface 111 and determine that it is to be operated upon as a REF1 type command.

In response to the first type of refresh command (REF1), a REF1 selected row is refreshed (304). For example, in response to the received REF1 command (or REF command to be treated as a REF1 command), memory device 120 may refresh the row in memory array 123 that corresponds to (e.g., pointed to) the value of REF1 refresh counter 126. A next row to be refreshed by the first type of refresh command (REF1) is selected from a sequence that includes all memory array rows (306). For example, for each REF1 command received (or REF command to be treated as a REF1 command), refresh sequence control 125 may step REF1 refresh counter 126 to a next value until REF1 refresh counter 126 has refreshed every row in memory array 123 whereupon refresh sequence control 125 sets refresh counter 126 back to an initial value and repeats the sequence as additional REF1 commands (or REF commands to be treated as REF1 commands) are received.

A second type of refresh command (REF2) is received (308). For example, memory device 120 may receive, via command interface 121, a REF2 command transmitted by controller 110 via command interface 111. In another example, memory device 120 may receive, via command interface 121, a REF command transmitted by controller 110 via command interface 111 and determine that it is to be operated upon as a REF2 type command. In response to the second type of refresh command (REF2), a REF2 selected row is refreshed (310). For example, in response to the received REF2 command (or REF command to be treated as a REF2 command), memory device 120 may refresh the row in memory array 123 that corresponds to (e.g., pointed to) the value of REF2 refresh counter 127.

A next row to be refreshed by the second type of refresh command (REF2) is selected from a sequence that does not include all memory array rows (312). For example, for each REF2 command received (or REF command to be treated as a REF2 command), refresh sequence control 125 may step REF2 refresh counter 127 to a next value that points to a row having a corresponding flag in map 128 set. When refresh sequence control 125 has refreshed every row in memory array 123 with a corresponding set flag, refresh sequence control 125 may set refresh counter 127 back to an initial value and repeat the sequence of stepping through the rows associated with set flags as additional REF2 commands (or REF commands to be treated as REF2 commands) are received.

FIG. 3B is a flowchart illustrating a method of a refreshing dynamic random access memory (DRAM). One or more of the steps illustrated in FIG. 3B may be performed by, for example, memory system 100, and/or its components. A first refresh command is received (352). For example, memory device 120 may receive, via command interface 121, a first REF memory device 120 may receive, via command interface 121, a REF1 command transmitted by controller 110 via command interface 111.

In response to the first refresh command, it is determined to operate on the first refresh command as a first type of refresh command (353). For example, in response to the first REF command, memory device 120 may determine to operate on the first REF command as a REF1 command. In another example, memory device 120 may determine to operate on the first REF command as a REF1 command based at least in part on a decoding of the first REF command.

In response to determining to operate on the first refresh command as a REF1 command, a REF1 selected row is refreshed (354). For example, in response to the received REF command to be treated as a REF1 command, memory device 120 may refresh the row in memory array 123 that corresponds to (e.g., pointed to) the value of REF1 refresh counter 126. In another example, in response to decoding the received REF command as a REF1 command, memory device 120 may refresh the row in memory array 123 that corresponds to (e.g., pointed to) the value of REF1 refresh counter 126.

A next row to be refreshed by the first type of refresh operation is selected from a sequence that includes all memory array rows (356). For example, for each REF command that is treated or decoded as a REF1 command, refresh sequence control 125 may step REF1 refresh counter 126 to a next value until REF1 refresh counter 126 has refreshed every row in memory array 123 whereupon refresh sequence control 125 sets refresh counter 126 back to an initial value and repeats the sequence as additional REF commands to be treated as, or are decoded as, REF1 commands are received.

A second refresh command is received (358). For example, memory device 120 may receive, via command interface 121, a second REF command transmitted by controller 110 via command interface 111. In another example, memory device 120 may receive, via command interface 121, a REF2 command transmitted by controller 110 via command interface.

In response to the second refresh command, it is determined to operate on the second refresh command as a second type of refresh command (359). For example, in response to the second REF command, memory device 120 may determine to operate on the second REF command as a REF2 command. In another example, memory device 120 may determine to operate on the second REF command as a REF2 command based at least in part on a decoding of the second REF command.

In response to determining to operate on the second refresh as the second type of refresh command, a REF2 selected row is either refreshed or not refreshed based on a flag associated with the REF2 selected row (360). For example, in response to the received REF command to be treated as a REF2 command, memory device 120 may, based on the value of the flag in map 128 associated with the row in memory array 123 that corresponds to (e.g., pointed to) the value of REF2 refresh counter 127, either refresh or not refresh that row. In another example, in response to decoding the received REF command as a REF2 command, memory device 120 may, based on the value of the flag in map 128 associated with the row in memory array 123 that corresponds to (e.g., pointed to) the value of REF2 refresh counter 127, either refresh or not refresh that row.

A next row to be conditionally refreshed by the second type of refresh operation is selected from a sequence that does not include all memory array rows (362). For example, for each REF command that is treated or decoded as a REF2 command, refresh sequence control 125 may step REF2 refresh counter 127 to a next value that points to a row having a corresponding flag in map 128 set. When refresh sequence control 125 has refreshed every row in memory array 123 with a corresponding set flag, refresh sequence control 125 may set refresh counter 127 back to an initial value and repeat the sequence of stepping through the rows associated with set flags as additional REF commands to be treated, or are decoded as, a REF2 command are received.

Figure 4:
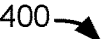
FIG. 4 is a diagram illustrating a floorplan for row address decoding with refresh flag circuitry.

FIG. 4 is a diagram illustrating a floorplan for row address decoding with refresh flag circuitry. FIG. 4 may be an example floorplan of, for example, memory array 123. In FIG. 4, memory array 400 comprises master wordline (MWL) drivers 431-431*c*, MWL flag circuits 432*a*-432*c*, row most significant bits (MSB) decoders 433*a*-433*c*, row least significant bits (LSB) decoders 435*a*-435*b*, master wordlines 436*a*-436*c*, local wordlines 437*a*-437*b*, pre-decoded signals 438*a*-438*b*, sense amplifier stripes 439*a*-439*b*, row address signal lines 441, and row flag control signal lines 442.

At least a first portion of row address signal lines 441 are operatively coupled to MSB decoders 433*a*-433*c* and a second portion to LSB decoders 435*a*-435*b*. In operation, the most significant bits of the row address are driven on row address signal lines 441 and decoded by MSB decoders 433*a*-433*c* to determine which master wordline 436*a*-436*c* is activated. LSB decoders 435*a*-435*b* are for the least significant bits (typically two bits—the FIG. 4 illustrates only 1 bit). LSB decoders 435*a*-435*b* create pre-decoded signals 438*a*-438*b* that are driven vertically up the sense-amplifier stripe and then in a horizontal direction perpendicular to the vertically disposed master wordlines 436*a*-436*c*. Local wordlines 437*a*-437*b* connected to the bit cells are interleaved and driven from the intersection of MWL 436*a*-436*c* and pre-decoded LSB addresses. MWL flag circuitry 432*a*-432*c* implements at least one flag bit that affects whether a REF2 command will refresh the local wordlines 437*a*-437*b* coupled to a given MWL 436*a*-436*c*. Thus, it should be understood that MWL flag circuitry 432*a*-432*c* implements a map of which MWLs 436*a*-436*c* should be refreshed by REF2 commands. Accordingly, MWL flag circuitry 432*a*-432*c* collectively may be viewed as an example of map 128 of memory device 120.

Row flag control signal lines 442 control the operation and setting of the flag bit in MWL flag circuitry 432a-432c. Row flag control signal lines 442 include: a "Mode" indicator that is used to distinguishes between REF1 and REF2 commands; a "Value" indicator that provides the value to set in the flag bit; a "Global Set" indicator that enables all of the flag bits to be written at the same time; a "Write" indicator that writes a value to the latch. Each MWL flag circuit 432a-432c receives a respective indicator from a respective MSB decoder 433a-433c that indicates whether that respective MWL flag circuit 432a-432c is being addressed. Each MWL flag circuit 432a-432c provides a respective signal to an input to a respective MWL driver 431a-431c that activates or prevents activation of a respective MWL 436a-436c. The signals input to a MWL driver 431a-431c from MWL flag circuits 432a-432c may also be used to disable sense amplifiers if no MWLs 436a-436c are activated.

FIG. 5 is a diagram illustrating flag-bit circuitry for refresh power savings. The flag-bit circuitry illustrated in FIG. 5 may be used as, for example, MWL flag circuits 432a-432c. In FIG. 5, flag-bit circuitry 500 comprises: switching devices (e.g., NFET, PFET) 501-503, one bit latch 504, AND gate 505, and 2:1 MUX 506. It should be understood that latch 504 as shown in FIG. 5 is implemented as a cross-coupled inverter pair with a weak holding path that is overdriven when written to. In another embodiment, latch 504 might include an enable port controlled by the signal Write. Switching device 503 is controlled by input signal "Write" and selectively couples the input signal "Value" to a first switched terminal of switching device 501 and a first switched terminal of switching device 502. The second switched terminal of switching device 501 and the second switched terminal of switching device 502 are both is coupled to the input of latch 504. Switching device 501 is controlled by the input signal "MSBdec". Switching device 502 is controlled by the input signal "GlobalSet".

The output of latch 504 (which holds the flag bit) is coupled to a first input of AND gate 505. The second input of AND gate 505 receives the input signal "MSBdec". The output of AND gate 505 is coupled to the "1" input of MUX 506. MSBdec is coupled to the "0" input of MUX 506. MUX 506 is controlled by the input signal "Mode". The output of MUX 506 is the signal "bMWL".

The signal "Mode" distinguishes between the REF1 and REF2 commands. "MSBdec" is the output of the MSB decoder (e.g., a respective one of MSB decoders 433a-433c). "Write" enables writing latch 504, either globally if "GlobalSet" is active or addressed if "MSBdec" is active. The signal "bMWL" is the input to a respective MWL driver 431a-431c and may be used to disable a sense-amplifier stripe if no wordline is to be driven.

Figure 6:
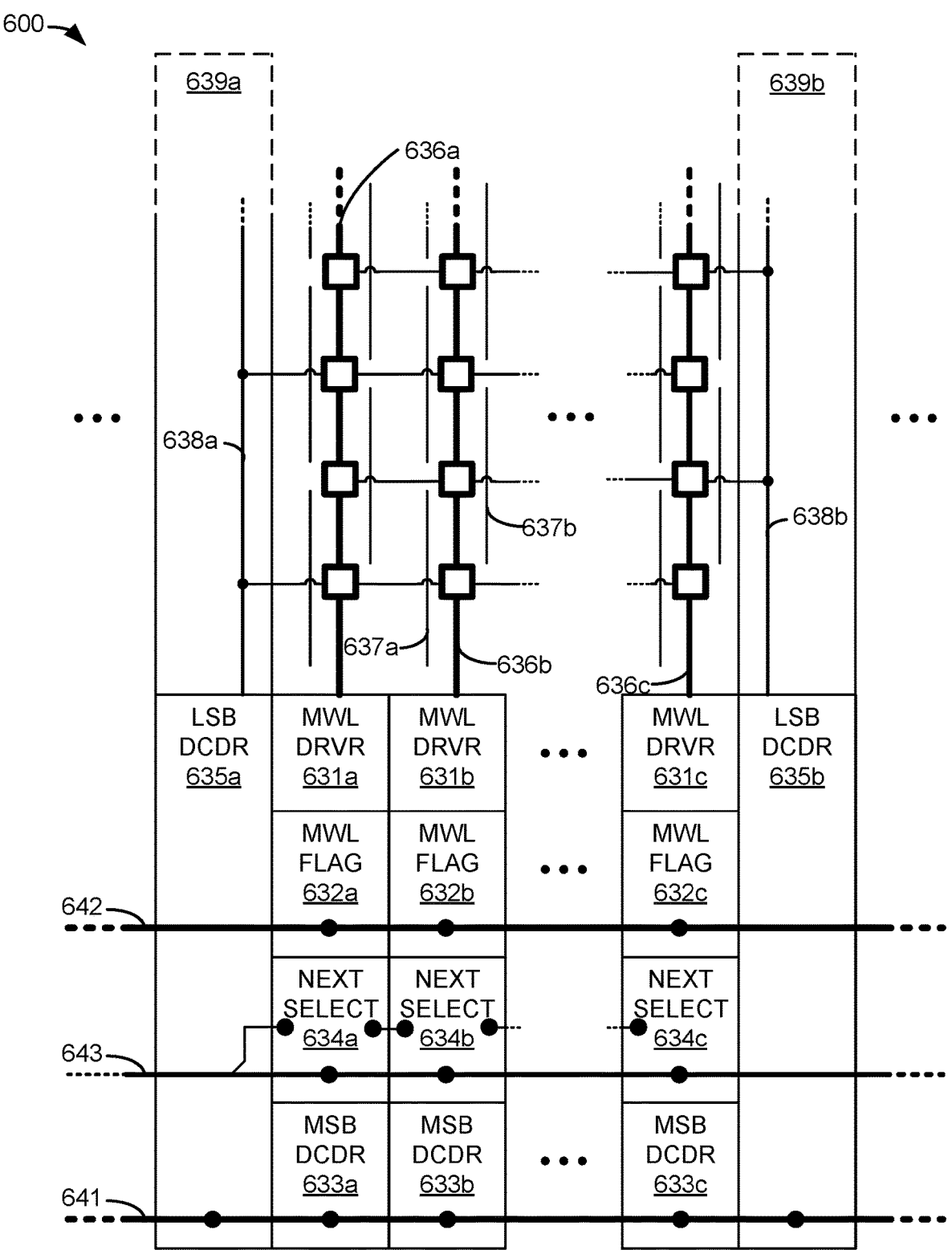
FIG. 6 is a diagram illustrating a floorplan for row address decoding with refresh power savings and refresh command bandwidth savings.

FIG. 6 is a diagram illustrating a floorplan for row address decoding with refresh power savings and refresh command bandwidth savings. FIG. 6 may be an example floorplan of, for example, memory array 123. In FIG. 6, memory array 600 comprises master wordline (MWL) drivers 631-631c, MWL flag circuits 632a-632c, REF2 next row select circuits 634a-634c, row most significant bits (MSB) decoders 633a-633c, row least significant bits (LSB) decoders 635a-635b, master wordlines 636a-636c, local wordlines 637a-637b, pre-decoded signals 638a-638b, sense amplifier stripes 639a-639b, row address signal lines 641, row flag control signal lines 642, and next row select signals 643.

At least a first portion of row address signal lines 641 are operatively coupled to MSB decoders 633a-633c and a second portion to LSB decoders 635a-635b. In operation, the most significant bits of the row address are driven on row address signal lines 641 and decoded by MSB decoders 633a-633c to determine which master wordline 636a-636c is activated. LSB decoders 635a-635b are for the least significant bits (typically two bits—the FIG. 6 illustrates only 1 bit). LSB decoders 635a-635b create pre-decoded signals 638a-638b that are driven vertically up the sense-amplifier stripe and then in a horizontal direction perpendicular to the vertically disposed master wordlines 636a-636c. Local wordlines 637a-637b connected to the bit cells are interleaved and driven from the intersection of MWL 636a-636c and pre-decoded LSB addresses.

MWL flag circuitry 632a-632c implements at least one flag bit that affects whether next row select circuits 634a-634c will select a respective local wordline 637a-637b to be refreshed by a given REF2 command. Next row select circuits 634a-634c are coupled to respective MWL driver circuits 631a-631c. Similar to memory array 400 illustrated in FIG. 4, it should be understood that MWL flag circuitry 632a-632c implements a map of which MWLs 636a-636c should be refreshed by REF2 commands. Accordingly, MWL flag circuitry 632a-632c collectively may be viewed as an example of map 128 of memory device 120. It should be understood that next row select circuitry 634a-634c implements a counter through MWLs 636a-636c that should be refreshed by REF2 commands. Accordingly, next row select circuitry 632a-632c collectively may be viewed as an example of counter 127 of memory device 120.

Row flag control signal lines 642 control the operation and setting of the flag bit in MWL flag circuitry 632a-632c. Row flag control signal lines 642 include: a "Mode" indicator that is used to distinguish between REF1 and REF2 commands; a "Value" indicator that provides the value to set in the flag bit; a "Global Set" indicator that enables all of the flag bits to be written at the same time; a "Write" indicator that writes a value the latch. Each MWL flag circuit 632a-632c receives a respective indicator from a respective MSB decoder 633a-633c that indicates whether that respective MWL flag circuit 632a-632c is being addressed. Each MWL flag circuit 632a-632c provides a respective signal to an input to a respective MWL driver 631a-631c that activates or prevents activation of a respective MWL 636a-636c. The signals input to a MWL driver 631a-631c from MWL flag circuits 632a-632c may also be used to disable sense amplifiers if no MWLs 636a-636c are activated.

Next row select circuits 634a-634c provide a shifting function that is based on the value of the flag stored by MWL flag circuits 632a-632c. The starting next row select circuit 633a of the shifting function receives an indicator of a REF2 command via next row select signals 643. The shifting function of next row select circuits 634a-634c then propagates that indicator through next row select circuits 634a-634c until a flag value and internal control state is reached that indicates a row that should be refreshed by a REF2 command. That row is selected and refreshed, and a control state indicator is set in that next row select circuit 634a-634c to not select that row for refresh regardless of the flag value stored in the associated MWL flag circuit 632a-632c. Thus, for the next received REF2 command, the indicator propagates past the just REF2 refreshed row (due to the internal control state) until it reaches the next row select circuit 634a-634c with a flag value that indicates the associated row should be refreshed by a REF2 command.

This process continues until each row with an associated flag value indicating the row is to be refreshed by REF2 commands has been refreshed. A reset signal in next row select signals 643 may then reset all of the internal control states of next row select circuits 634a-634c so that the process of refreshing only flagged rows with REF2 commands may begin again at the beginning.

FIG. 7 is a diagram illustrating the cascading of row circuitry for refresh command bandwidth savings. FIG. 7 may be an illustration of the interconnection of, for example, MWL flag circuits 632a-632c and next row select circuits 634a-634c. In FIG. 7, next row select chain 700 comprises MWL flag circuits 732a-732d and next row select circuits 734a-734d. Each next row select circuit 734a-734d receives the value of the respective flag FlagA-FlagD stored by the respective associated MWL flag circuit 732a-732d. Each MWL flag circuit 732a-732d receives a respective refresh indicator DCD2A-DCD2D from the respective associated next row select circuit 734a-734d that indicates whether to refresh the associated row. A respective forwarded REF2 signal REF2A-REF2E is cascaded from REF2I input of each next row select circuit 734a-734d to the REF2O output of each next row select circuit 734a-734d which is connected to the REF2I input of the next adjacent next row select circuit 734b-734d.

As discussed herein, the forwarded REF2 signal (REF2A-REF2E) is cascaded until a next row select circuit 734a-734d in the cascade chain is reached that has: (a) a flag input FlagA-FlagD indicating a row that is to be refreshed by a REF2 command; and (b) the internal state of a next row select circuit 734a-734d indicates the associated row has not been refreshed by a REF2 command since the last reset (e.g., by the RESET signal). That row is then refreshed, and the internal state set to indicate the associated row has already been refreshed by a REF2 since the last RESET signal. Thus, when the next REF2 command is received, it is cascaded past the row just refreshed until another row is encountered that meets the conditions (above) for being refreshed by a REF2 command.

Figure 8:
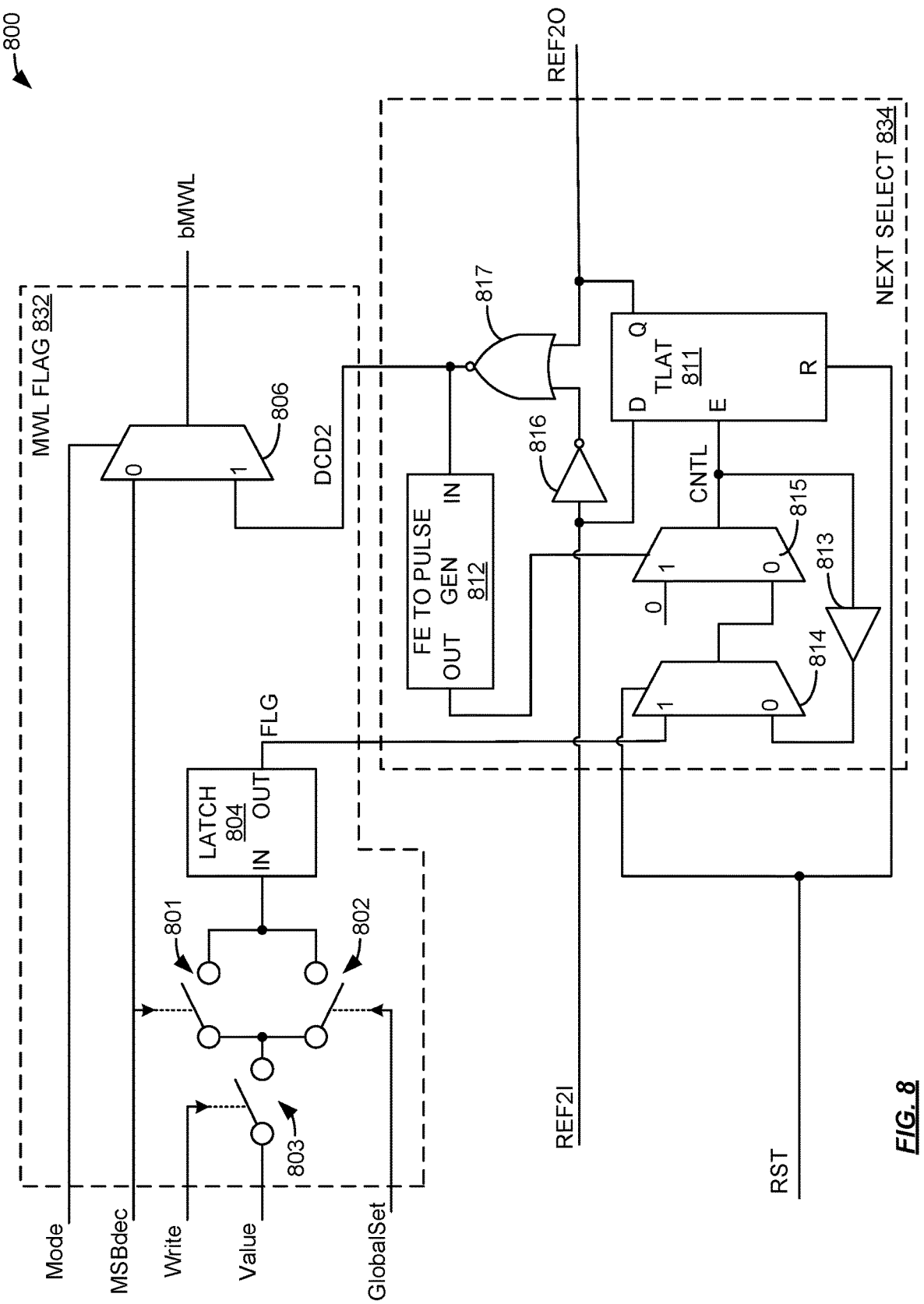
FIG. 8 is a diagram illustrating circuitry for refresh row selection with refresh power savings and refresh command bandwidth savings.

FIG. 8 is a diagram illustrating circuitry for refresh row selection with refresh power savings and refresh command bandwidth savings. The refresh row selection circuitry illustrated in FIG. 8 may be used as, for example, MWL flag circuits 632a-632c, next row selection circuits 634a-634c, MWL flag circuits 732a-732d, and/or next row selection circuitry 734a-734. In FIG. 8, refresh row selection circuitry 800 comprises: switching devices (e.g., NFET, PFET) 801-803, one bit latch 804, 2:1 MUX 806, transparent latch 811, falling edge to pulse generator 812, buffer 813, 2:1 MUX 814, 2:1 MUX 815, inverter 816, and NOR gate 817. It should be understood that latch 804 as shown in FIG. 8 is implemented as a cross-coupled inverter pair with a weak holding path that is overdriven when written to. In another embodiment, latch 804 might include an enable port controlled by the signal Write.

Switching device 803 is controlled by input signal "Write" and selectively couples the input signal "Value" to a first switched terminal of switching device 801 and a first switched terminal of switching device 802. The second switched terminal of switching device 801 and the second switched terminal of switching device 802 are both coupled to the input of latch 804. Switching device 801 is controlled by the input signal "MSBdec". Switching device 802 is controlled by the input signal "GlobalSet".

The output of latch 804 (which holds the flag bit) is coupled to the "1" input of MUX 814. MSBdec is coupled to the "0" input of MUX 806. MUX 806 is controlled by the input signal "Mode". The output of MUX 806 is the signal "bMWL". The signal "Mode" distinguishes between the REF1 and REF2 commands. "MSBdec" is the output of the MSB decoder (e.g., a respective one of MSB decoders 633a-633c). "Write" enables writing latch 804, either globally if "GlobalSet" is active or addressed if "MSBdec" is active. The signal "bMWL" is the input to a respective MWL driver 631a-631c may be used to disable a sense-amplifier stripe if no wordline is to be driven. From the foregoing, it should be understood that switching devices 801-803, one bit latch 804, and 2:1 MUX 806 form a MWL flag circuit 832.

The flag value FLG from MWL flag circuit 832 is received by the "1" input of MUX 814. The refresh indicator input REF2I is connection to the data "D" input of transparent latch 811 and the input of inverter 816. Transparent latch 811 also has an enable input "E". When the E input is low, the value at the D input of transparent latch 811 flows to the output "Q" of transparent latch 811. When the E input is high, transparent latch 811 holds (i.e., latches) the current value at the output Q regardless of the state of the D input.

The output of MUX 814 is coupled to the "0" input of MUX 815. The output of MUX 215 (CNTL) is coupled to the input of buffer 813. The output of buffer 813 is coupled to the "0" input of MUX 814. Thus, it should be understood that when the select inputs of MUX 814 and MUX 815 are both "0", a feedback loop is formed that latches the value CNTL at the enable input of transparent latch 811.

The reset signal RST is coupled to the select input of MUX 814 and the reset input of transparent latch 811. Thus, when the reset signal RST is asserted and while signal REF2I is zero, MUX 815 selects its "0" input (from MUX 814) and the output of transparent latch 811 is set to "0" and the internal state node CNTL is set to the value of the flag stored by MWL flag circuit 832.

The output of inverter 816 is coupled to a first input of NOR 817. The output of transparent latch 811 is coupled to the second input of NOR 817. The output of NOR 817 is coupled to the input of falling edge to pulse generator 812 and the "1" input of MUX 806. The output of falling edge to pulse generator 812 is coupled to the select input of MUX 815. In response to a falling edge at the input (IN) port of pulse generator 812, pulse generator 812 generates a positive pulse (i.e., low-high-low) The "0" input of MUX 815 is tied to a logic "0". Thus, a falling edge on the output of NOR 815 causes a pulse on the select input of MUX 815 that sets the internal state CNTL to a "0". Once the internal state CNTL is a "0", transparent latch 811 remains transparent and simply passes the refresh indicator REF2I to the cascaded output REF2O. From the foregoing, it should be understood that transparent latch 811, falling edge to pulse generator 812, buffer 813, 2:1 MUX 814, 2:1 MUX 815, inverter 816, and NOR gate 817 form a next row select circuit 834.

In operation, next row select circuit 834 provides the shifting function for the REF2 indicator. The enable (E) input of transparent latch 811 makes the latch either transparent or holds the output. The internal state (CNTL) signal of next row select circuit 834 can be set to the flag value from MWL flag circuit 832 with the reset (RST) signal or to "0" with a pulse edge triggered from the output of the next row select circuit 834 circuit DCD2. If a pulse edge on DCD2 or a reset signal is not provided, then the internal state signal (CNTL) signal holds its state.

Figure 9:
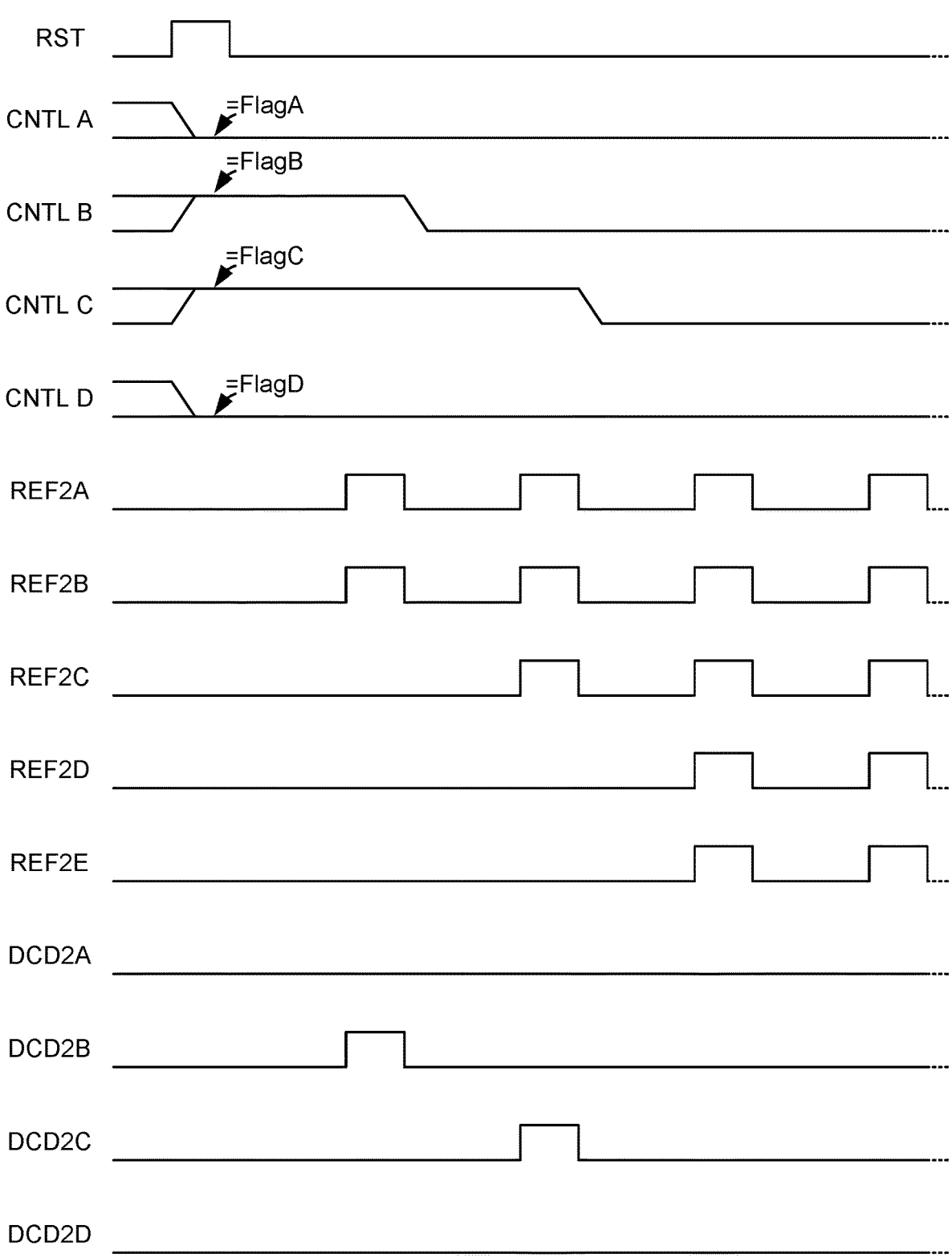
FIG. 9 is an example timing diagram illustrating the operation of row circuitry.

FIG. 9 is an example timing diagram illustrating the operation of next row to refresh select circuitry. FIG. 9 illustrates the operation of, for example, select chain 700 when implemented using the refresh row selection circuitry 800. In FIG. 9, FlagA of MWL flag circuit 732a is set to a "0"; FlagB of MWL flag circuit 732b is set to a "1"; FlagC of MWL flag circuit 732c is set to a "1"; and, FlagD of MWL flag circuit 732d is set to a "0". At the beginning of a refresh cycle a reset signal (RESET, RST) is issued. The reset signal copies the flag bit at each next row select circuit 734a-734d to the internal control/state signal CNTL. When the first REF2 indicator is received, the latch of next row select circuit 734a is transparent, and the REF2 indicator progresses to next row select circuit 734b. The internal control/state signal CNTL of next row select circuit 734b is set to 1, so three actions occur: (i) the REF2 indicator does not progress further, (ii) the signal REF2B is generated, activating the corresponding MWL circuit 732b, and (iii) the falling edge of REF2B sets internal control/state signal CNTL of next row select circuit 734b to zero and makes the transparent latch 811 of next row select circuit 734b transparent. The next REF2 indicator then progresses to next row select circuit 734c where the same actions occur as previously did in next row select circuit 734b. After the second REF2 indicator all four next row select circuit 734a-734d are transparent until the next reset.

Figure 10:
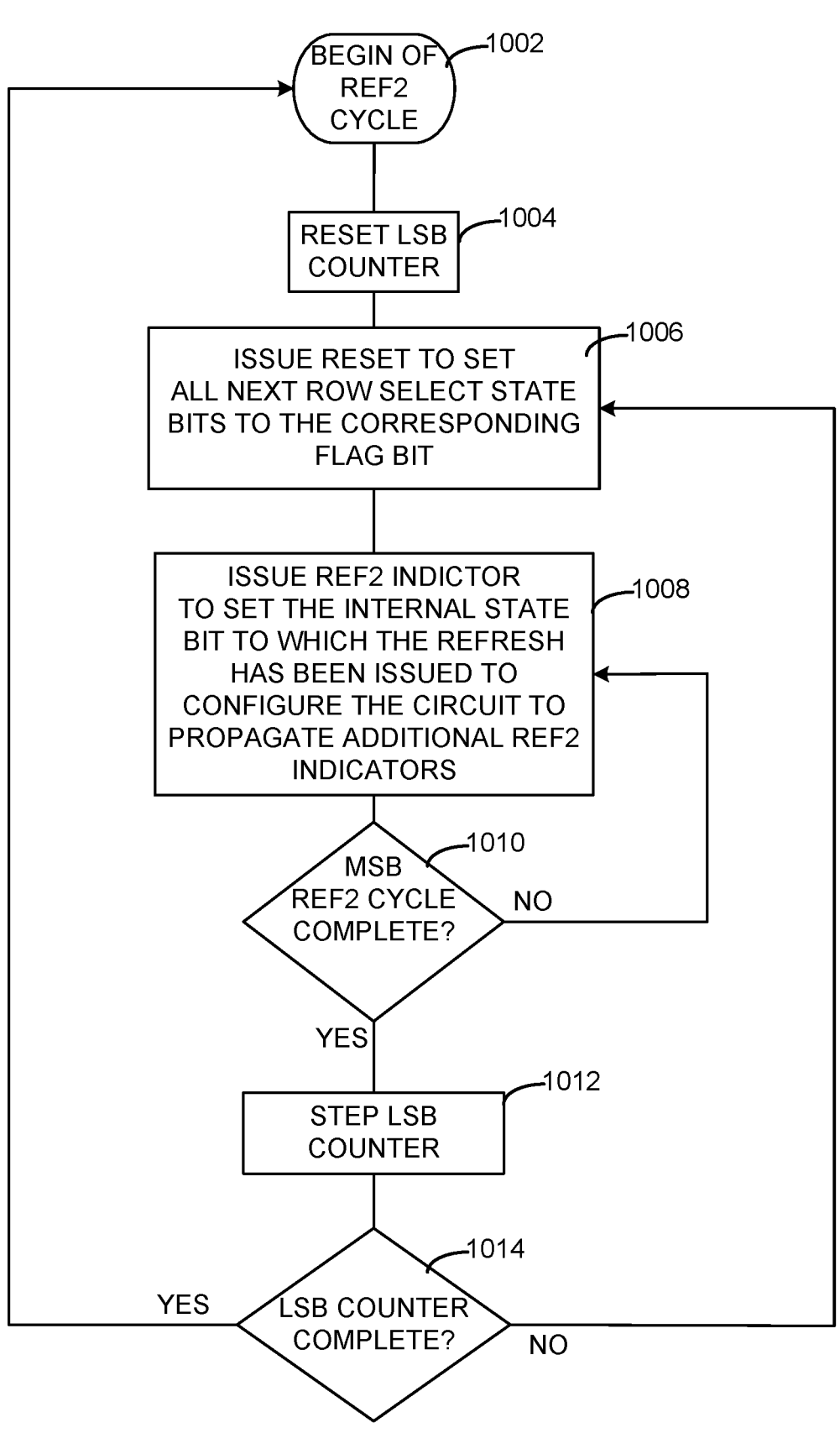
FIG. 10 is a flowchart illustrating the operation of a conditional row refresh.

FIG. 10 is a flowchart illustrating the operation of a conditional row refresh. One or more of the steps illustrated in FIG. 10 may be performed by, for example, memory system 100, and/or its components. A first type of refresh cycle (REF2) is begun (1002). For example, controller 110 may issue to memory 120 a REF2 command via command interface 111. A least significant bits (LSB) counter is reset (1004). For example, sequence control 125 may reset a counter associated with the least significant bits of a row address that selects the individual local wordlines associated with master wordlines.

A reset signal is issued to set all next row select state bits to the corresponding flag bit (1006). For example, the sequence control 125 may assert the RESET signal that causes each next row select circuit 734a-734d to copy the value of the flag bit FlagA-FlagD from respective MWL flag circuits 732a-732d to the respective internal control/state signal CNTL. A REF2 indicator is issued to set the internal state bit to which the refresh has been issued to configure the circuit to propagate additional REF2 indicators (1008). For example, sequence control 125 may assert a REF2 indicator that is propagated to next row select circuit 734b. In response, the internal control/state signal CNTL of next row select circuit 734b is set to 1 which causes: (i) the REF2 indicator does not progress further, (ii) the signal REF2B is generated, activating the corresponding MWL circuit 732b, and (iii) the falling edge of REF2B sets internal control/state signal CNTL of next row select circuit 734b to zero and makes the transparent latch 811 of next row select circuit 734b transparent.

If there are more REF2 operations to be performed (MSB cycle incomplete), flow proceeds back to box 1008 for more refresh cycles of the selected (by LSB) local wordlines associated with flagged MWL's to be performed. If there are no more REF2 operation to be performed (MSB cycle complete), flow proceeds to box 1012 (1010). In box 1012, the LSB counter is stepped (1012). For example, sequence control 125 may increment (or alternatively, decrement) the counter associated with the least significant bits of the row address that selects the individual local wordlines associated with master wordlines.

If there are more REF2 operations to be performed on the local wordlines (LSB cycle incomplete), flow proceeds back to box 1006 for more refresh cycles of the newly selected local wordlines. If there are no more REF2 operations to be performed on the local wordlines (LSB cycle complete), flow proceeds back to box 1002 to await the start of a new REF2 cycle (1014).

Table 1 details calculations that may be used to determine (or estimate) various parameters governing the issuance of two types of refresh commands. In Table 1: N equals the total number of pages (e.g., in memory array 123). M equals the number of pages to be refreshed more frequently (e.g., by REF2 commands). $t_{retl}$ equals a specified long maximum retention time (e.g., 64 ms). T equals the total number of refreshes over a period of $t_{retl}$. $t_{rets}$ equals a specified maximum short retention time (e.g., 32 ms). R equals the ratio of the specified long maximum retention time (e.g., 64 ms) to the specified maximum short retention time (e.g., 32 ms). $t_{refi}$ equals the refresh interval. $t_{refis}$ equals the refresh interval for REF2 type refreshes that are directed to rows to be refreshed more frequently. r equals the ratio of the second type of refreshes to the first type of refreshes.

TABLE 1

Total number of refreshes: $T = N + M \times (R - 1)$

Short retention time: $t_{rets} = \dfrac{t_{retl}}{R}$

Refresh interval: $t_{refi} = \dfrac{t_{retl}}{T}$

Refresh inverval of pages to be refreshed
more frequently (flagged pages) : $t_{refis} = \dfrac{t_{rets}}{M}$ Refresh interval ration (REF2 to REF1): $r = \dfrac{T - N}{N} = \dfrac{M \times (R - 1)}{N}$ An example calculation using the formulas in Table 1 and the parameters of: N=8, M=3, and R=3 results in fourteen (14) total refreshes over a long retention time period. This compares favorably with refreshing all N=8 rows over each short retention time period which would result in twenty-four (24) total refreshes over a long retention time period.

Figure 11:
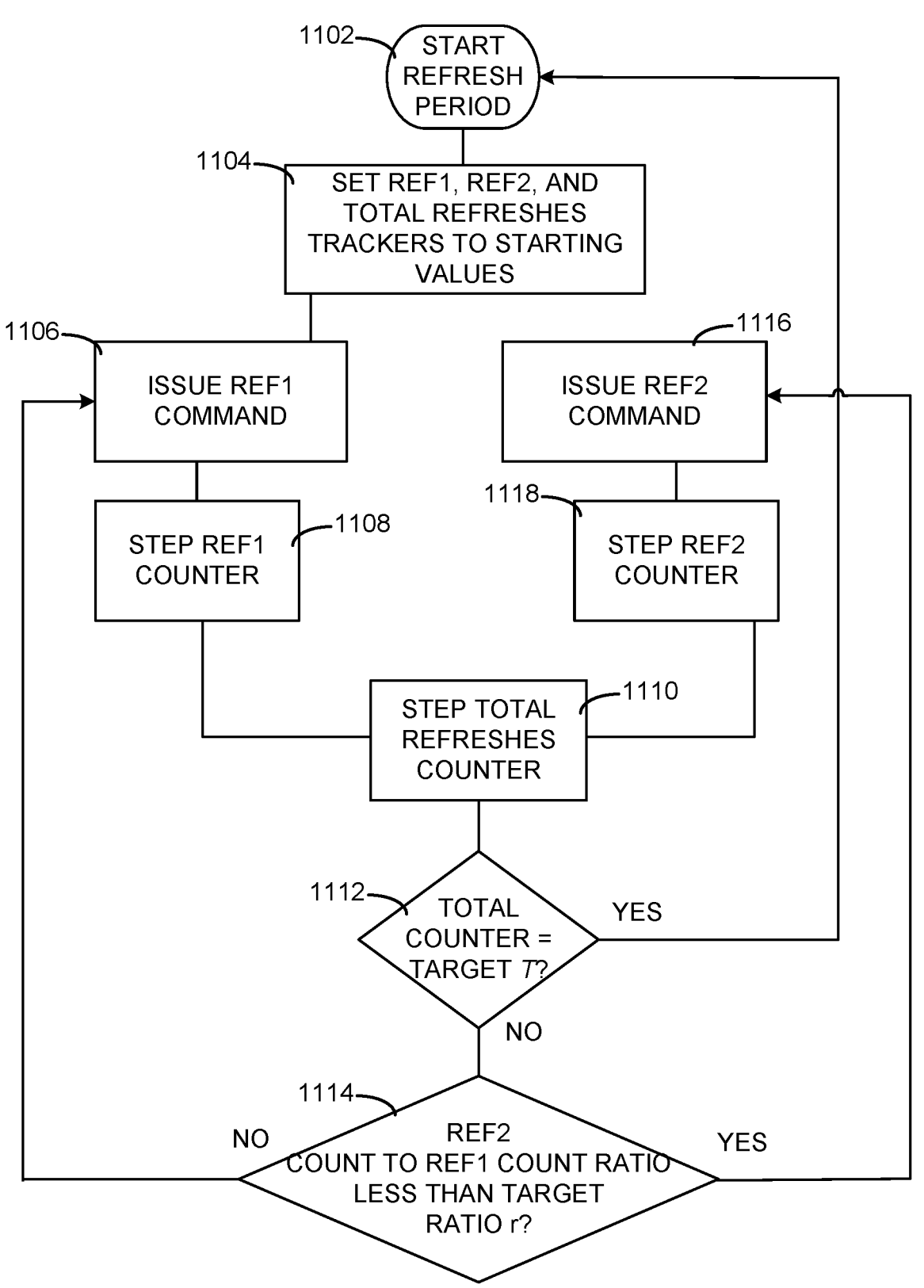
FIG. 11 is a flowchart illustrating the operation of a refresh cycle.

FIG. 11 is a flowchart illustrating the operation of a refresh cycle. One or more of the steps illustrated in FIG. 11 may be performed by, for example, memory system 100 and/or its components. FIG. 11 illustrates a configuration where refresh control 115 of controller 110 determines a type of refresh command (e.g., REF1 or REF2) to issue and then controller 110 transmits the corresponding type of command (e.g., REF1 or REF2) to memory device 120. However, a configuration where controller 110 transmits a single type of refresh command (e.g., REF) the appropriate total number of times (e.g., sum of the number of REF1 commands and the number of REF2 commands illustrated in FIG. 11) to memory device 120 is contemplated. In this configuration, memory device 120 determines (e.g., by sequence controller 125) the type of operations (i.e., REF1 or REF2) to perform and follows the steps similar to those in FIG. 11 described as being performed by refresh control 115. A refresh period is started (1102). For example, refresh control 115 may determine that a previous refresh period has completed and/or a new refresh period should begin.

Trackers for a first type of refresh (REF1), a second type of refresh (REF2), and a total number of refreshes may be set to starting values (1104). For example, refresh control 115 may set REF1 counter/tracker to a first initial value (representing a starting row) and set a REF2 counter/tracker (representing a starting row) to a second initial value. The first initial value and the second initial value may be, for example, equal. The first initial value and the second initial value may be, for example, not equal. The first initial value and the second initial value may differ, for example, by approximately one-half the total number of rows to be refreshed (e.g., N/2±5%, ±10%, or ±20%).

Setting different starting rows for the two types of refreshes can result in next row select circuits 734a-734d starting at the flagged master wordline nearest to master wordline 0 when the REF1 counter is around the middle of the row address range. This creates for each weak master wordline a reasonably narrow range of shorter and a longer refresh period depending on how the weak master wordlines are distributed among all master wordlines. By reducing the long refresh period slightly, the distribution of refresh periods for the weak (flagged) master wordlines can shift the longest refresh interval among all of the weak master wordlines below the maximum short retention time.

A first type of refresh command (REF1) is issued (1106). For example, controller 110 may issue a REF1 command to memory device 120 via command interface 111 that is received via command interface 121. The first type of refresh counter is stepped (1108). For example, refresh control 115 may increment REF1 counter 116 to count the total number of REF1 commands that have been issued in the current (long) refresh cycle to memory device 120. The total refresh counter is stepped (1110). For example, refresh control 115 may increment total refresh counter 118 to count the total number of REF1 and REF2 commands that have been issued in the current (long) refresh cycle to memory device 120.

If the total refresh counter has reached a count equal to a target (T) number of refreshes, flow proceeds to box 1102 to await the start of another refresh period. If the total refresh counter has not reached a count equal to a target (T) number of refreshes, flow proceeds to box 1114 (1112). In box 1114, if the ratio of the REF2 count to the REF1 count is not less than a target ratio (r), flow proceeds to box 1106. If the ratio of the REF2 count to the REF1 count is less than the target ratio (r), flow proceeds to box 1116 (1114).

In box 1116, a second type of refresh command (REF2) is issued (1116). For example, controller 110 may issue a REF2 command to memory device 120 via command interface 111 that is received via command interface 121. The second type of refresh counter is stepped (1118). For example, refresh control 115 may increment REF2 counter 117 to count the total number of REF2 commands that have been issued in the current (long) refresh cycle to memory device 120. Flow from boxes 1108 and 1118 unite at box 1110 where the total refresh counter is stepped (1110).

Figure 12:
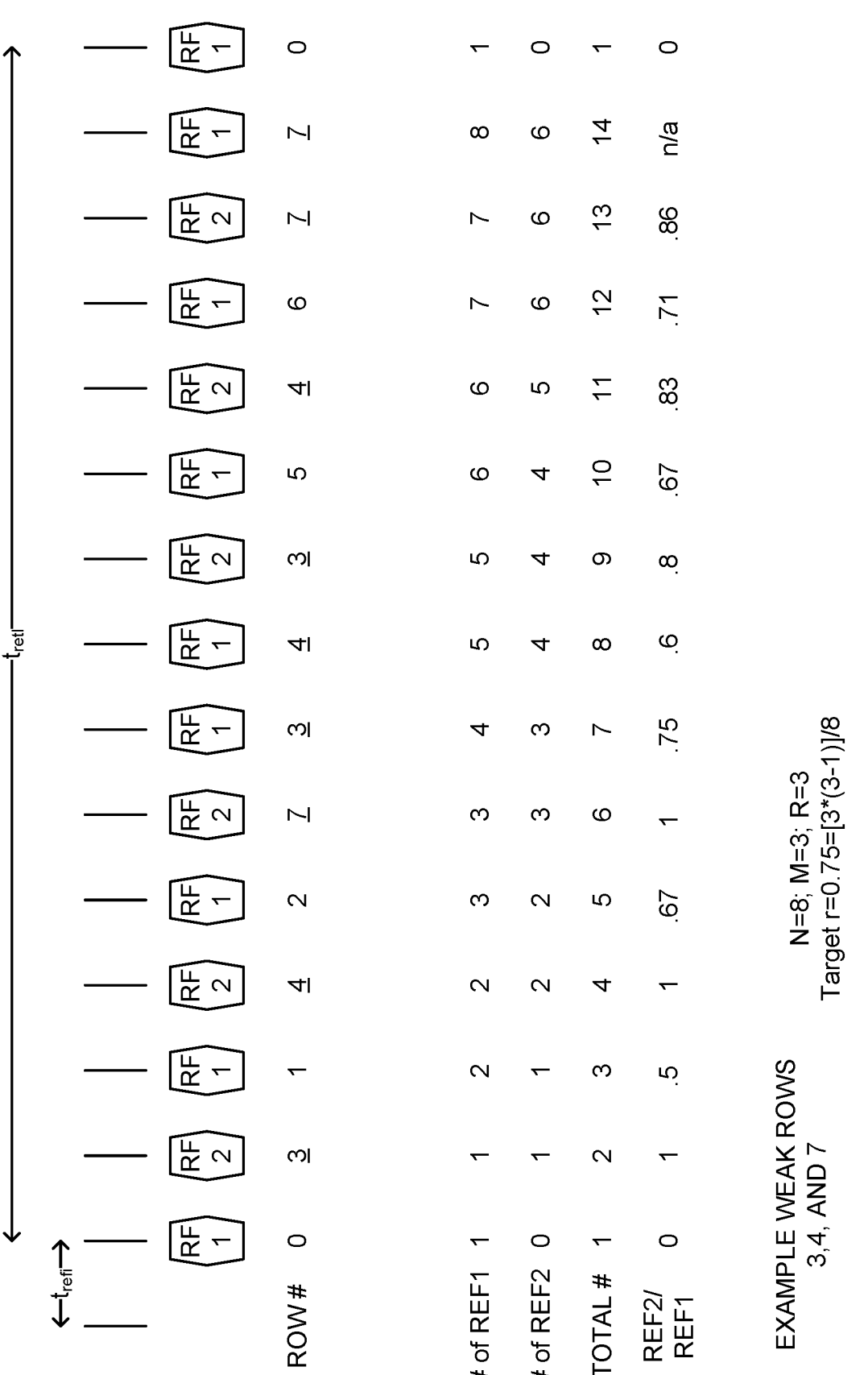
FIG. 12 is a diagram illustrating system commands for a refresh period.

FIG. 12 is a diagram illustrating system commands for a refresh period. The command sequence illustrated in FIG. 12 may be issued by, for example, controller 110. FIG. 12 illustrates two types of commands being transmitted—REF1 and REF2 (shown in FIG. 12 as RF1 and RF2). However, it is contemplated that, for example, memory device 120 may receive, via command interface 121, a single type of REF command transmitted by controller 110 via command interface 111 and determine internally the type of command (REF1 or REF2) to be performed. Thus, the types of commands (REF1 and REF2) illustrated in FIG. 12 may be considered to be, in the foregoing example, the types of operations performed by a memory device rather than the type of command transmitted by a controller.

The command sequence illustrated in FIG. 12 follows the flowchart illustrated in FIG. 11 with the total number of rows N=8, number of weak rows M=3 (example weak rows 3, 4, and 7), and the ratio of long retention period to short retention period of R=3. In FIG. 12 the row being refreshed in response to the REF1 or REF2 command above it is given by "Row #". The weak rows being refreshed are underlined regardless of type of refresh. Example totals of REF1, REF2, and total refresh commands issued during the refresh period are illustrated. The ratio (e.g., for decision box 1114) of REF2 to REF1 commands is also illustrated.

Figure 13:
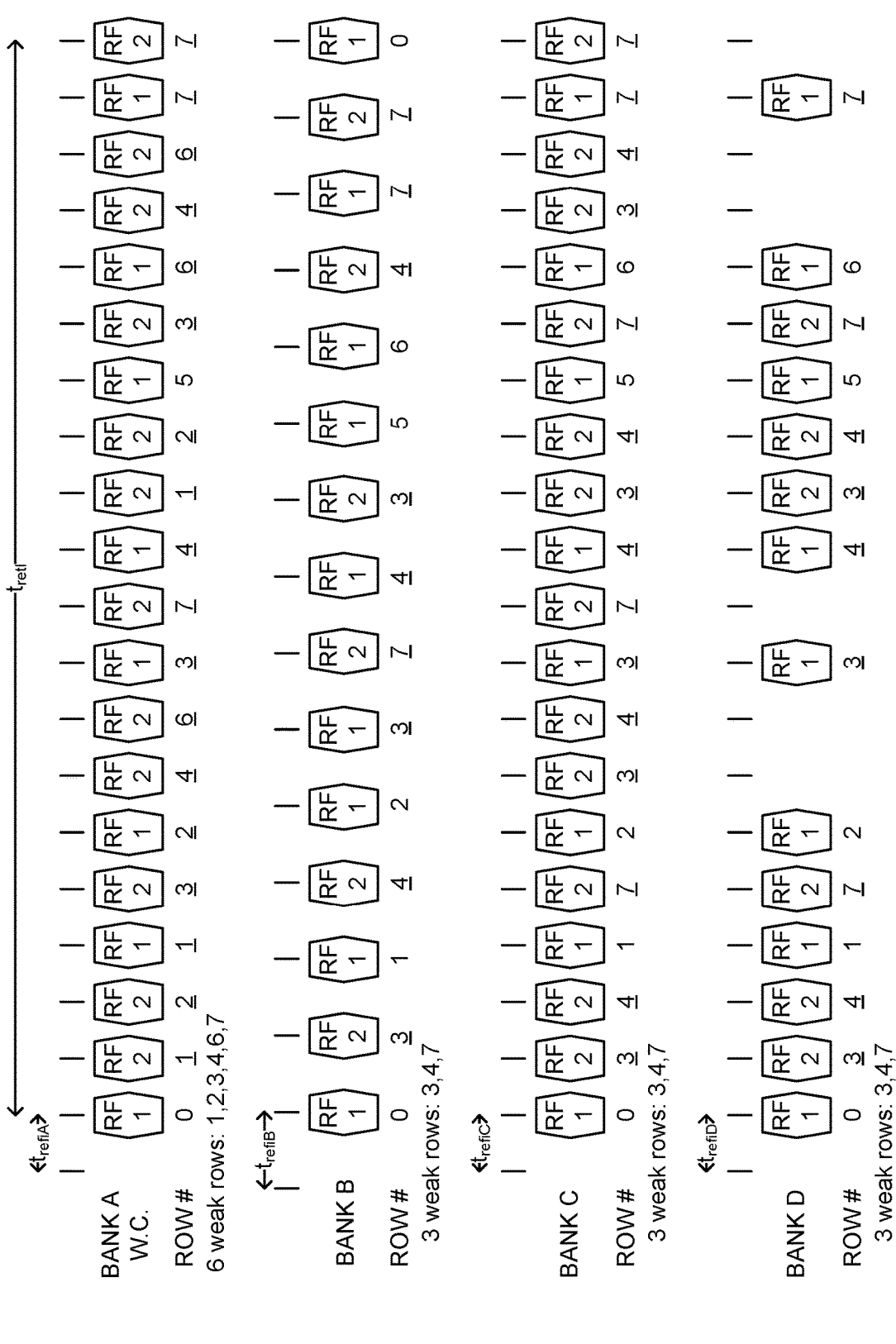
FIG. 13 is a diagram illustrating system commands for banks having unequal numbers of rows with short refresh periods.

FIG. 13 is a diagram illustrating system commands for banks having unequal numbers of rows with short refresh periods. In FIG. 13, the example refresh command sequence for the worst case row (labeled Bank A) corresponds to six weak rows (1, 2, 3, 4, 6, 7) out of eight (8) total rows. This worst case row results in a refresh interval of $t_{refiA}$. A first non-worst case row (labeled Bank B) corresponds to 3 weak rows (3, 4, 7). An example refresh command sequence illustrated in FIG. 13 for refreshing Bank B uses a different refresh interval ($t_{refiB}$) that is longer that the refresh interval $t_{refiA}$ used for Bank A. The sequence illustrated for Bank B corresponds to using a per bank number of REF2 commands.

A second non-worst case row (labeled Bank C) also corresponds to 3 weak rows (3, 4, 7). An example refresh command sequence illustrated in FIG. 13 for refreshing Bank C uses the same refresh interval ($t_{refiC}$) that is used for Bank A ($t_{refiA}$). The sequence illustrated for Bank C corresponds to using the same number of REF2 commands for all banks. The sequence illustrated for Bank C may trigger a reset of the refresh counters (e.g., REF1 counter 116, REF2 counter 117, and/or total refresh counter) when the end of the next row select circuitry for Bank A signals all of the flagged rows have been refreshed.

A third non-worst case row (labeled Bank D) also corresponds to 3 weak rows (3, 4, 7). An example refresh command sequence illustrated in FIG. 13 for refreshing Bank D uses the same refresh interval ($t_{refiC}$) that is used for Bank A ($t_{refiA}$). The sequence illustrated for Bank D corresponds to using the same number of refresh intervals (REF1 and REF2) for all banks but skipping REF2 commands that are not required for that row. The sequence illustrated for Bank D may trigger a reset of the refresh counters (e.g., REF1 counter 116, REF2 counter 117, and/or total refresh counter) each time the REF2 counter 117 reaches a target value for Bank A.

Figure 14A:
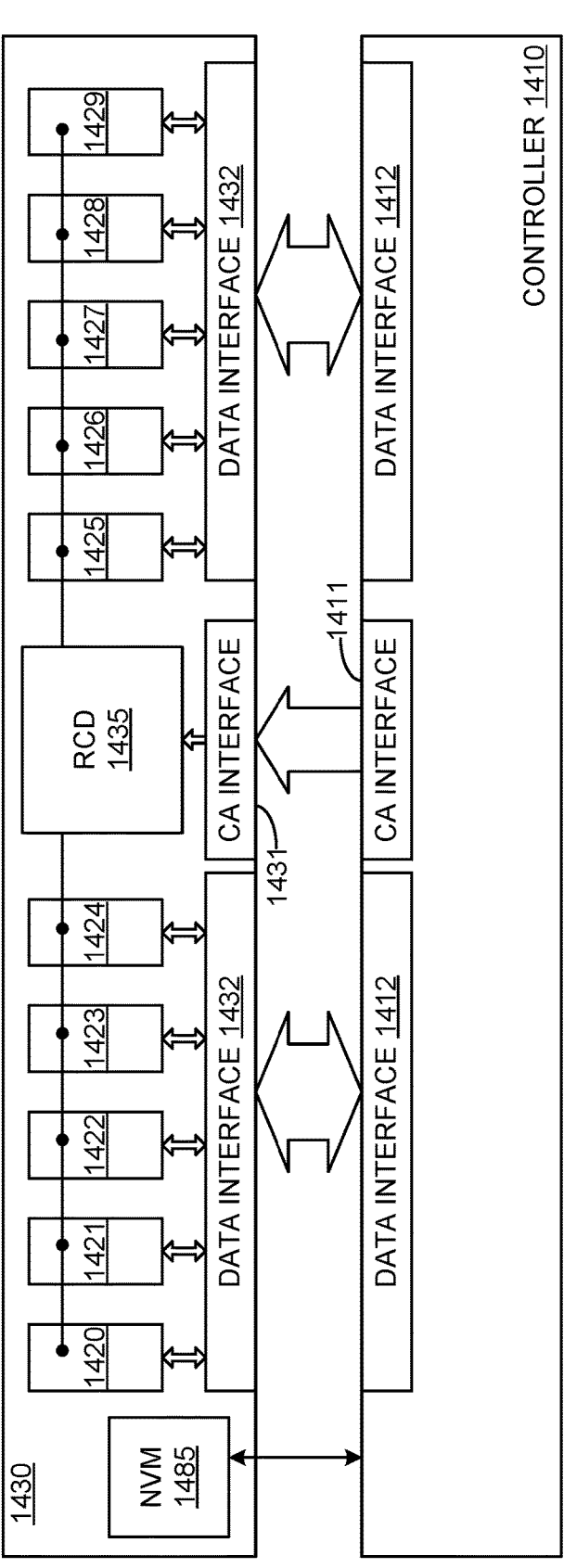
FIGS. 14A-14B are diagrams illustrating a memory system.
Figure 14B:
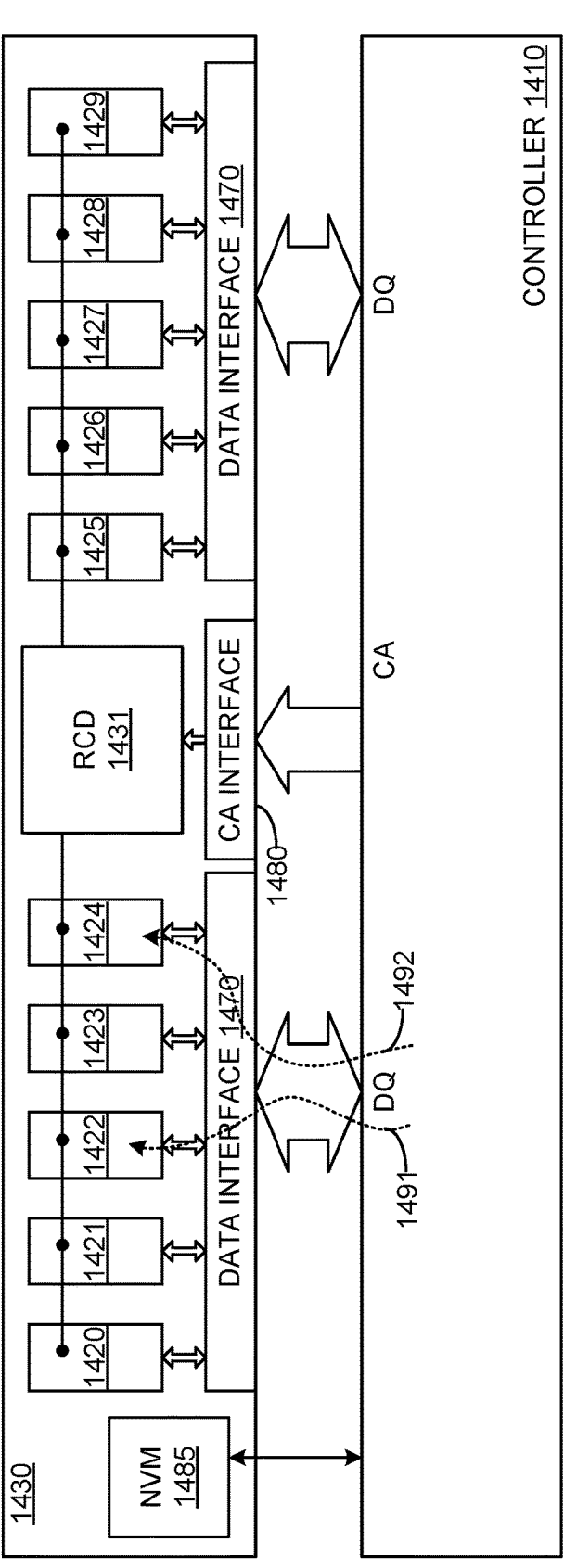

FIGS. 14A-14B are a diagrams illustrating a memory system. In FIGS. 14A-14B, memory system 1400 comprises controller 1410 and memory module 1430. Controller 1410 may be or correspond to controller 110 discussed herein with reference to FIG. 1. Controller 1410 includes command interface 1411 and data interface 1412. Module 1430 includes command interface 1431, data interface 1432, registering clock driver 1435, memory devices 1420-1429, and nonvolatile memory 1485.

Controller 1410 is operatively coupled to module 1430 via data signals (DQ) communicated via data interface 1412 and data interface 1432. Controller 1410 is operatively coupled to module 1430 via command-address signals (CA) communicated via command interface 1411 and command interface 1431. Nonvolatile memory 1485 is operatively coupled to controller 1410. In an embodiment, configuration information is read from nonvolatile memory 1485. The configuration information read from nonvolatile memory 1485 may include information detailing the number and/or location of rows in memory devices 1420-1429 that should be configured for shorter retention time (e.g., information comprising map 128). The configuration information read from nonvolatile memory 1485 may be provided on a per memory device 1420-1429 basis.

In an embodiment, controller 1410 reads row refresh configuration information (e.g., map 128) for each memory device 1420-1429 from nonvolatile memory 1485. Controller 1410 stores this information in the corresponding memory device 1420-1429 (e.g., in flag-bit circuitry 500 or row selection circuitry 800 thereby forming a map 128 in each memory device 1420-1429 of rows to be refreshed more often over a long refresh period).

Scheduling REF1 and REF2 commands to be performed by memory devices 1420-1429 may be done on a per memory device 1420-1429 basis. That is, controller 1410 may have memory devices 1420-1429 perform REF2 commands at different times/intervals from each other. To accomplish this, controller 1410 and module 1430 (and memory devices 1420-1429, in particular) should be individually addressable. In an embodiment, one or more DQ signals may be used to indicate which of memory devices 1420-1429 should perform the associated REF2 command. This is illustrated in FIG. 14B by arrows 1491 and 1492 running from controller 1410 to memory device 1422 and memory device 1424, respectively to indicate memory device 1422 and memory 1494 are to perform a REF2 command received via command interface 1480 and relayed by RCD 1435.

In another embodiment, the REF2 command communicated via command interface 1411 and command interface 1431 itself may indicate (i.e., with an address) which of memory devices 1420-1429 should perform the REF2 command. To configure memory devices 1420-1429 to respond to the appropriate indicator, a per memory devices 1420-1429 unique identifiers may be configured into each of memory devices 1420-1429 during an initialization operation.

Figure 15:
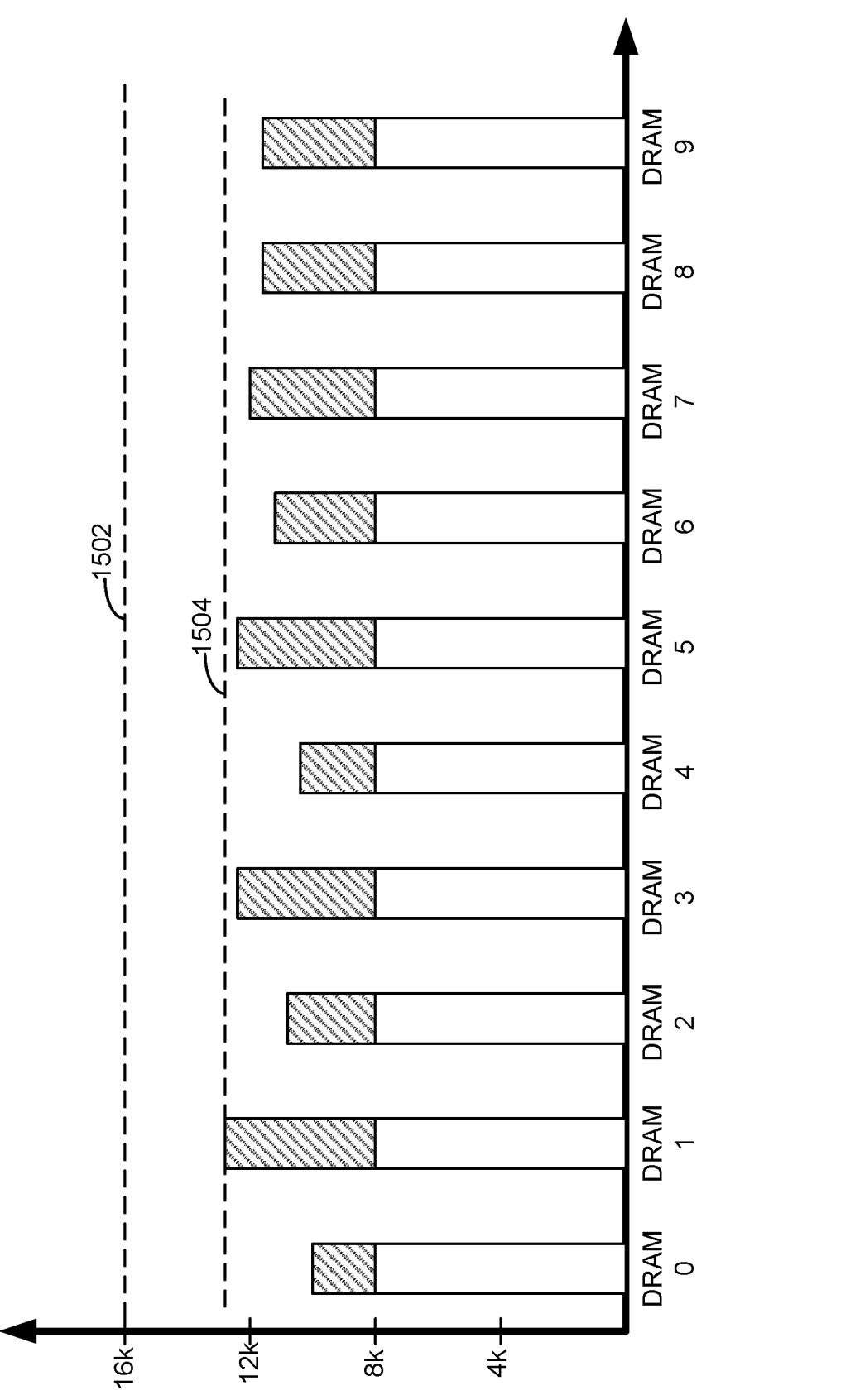
FIG. 15 is a bar chart illustrating an example distribution of refresh commands among devices on a module.

FIG. 15 is a bar chart illustrating an example distribution of refresh commands among devices on a module. In FIG. 15, the hash filled portion of each bar represents the number of REF2 commands issued and the white portion of each bar represents the number of REF1 commands. In FIG. 15, line 1502 illustrates an example number of refresh operations that would be performed by the devices on a module if all of the rows in DRAM0-DRAM9 were refreshed according to the same refresh cycle (retention time) period. Line 1504 illustrates an example number of refresh operation that would be performed by the devices on a module if the number of REF2 commands issued per refresh cycle was configured to accommodate the worst case DRAM device on the module. Note the significant savings in numbers of refreshes performed between line 1502 and 1504.

FIG. 16 is a flowchart illustrating a method of operating a dynamic random access memory (DRAM) device. One or more of the steps illustrated in FIG. 16 may be performed by, for example, memory system 100 and/or its components. Via a command interface, a first refresh command is received (1602). For example, memory device 120 may receive a first REF command. In another example, memory device 120 may receive a REF1 command.

It is determined to treat the first refresh command as a first type of refresh command (1604). For example, based on internal state, memory, and/or a finite state machine, memory device 120 may elect to treat the first REF command as a REF1 command and determine a REF1 type refresh operation should be performed. In another example, memory device 120 may decode the first REF command to determine a REF1 type refresh operation should be performed.

Via a command interface, a second refresh command is received (1606). For example, memory device 120 may receive a second REF command. In another example, memory device 120 may receive a REF2 command. It is determined to treat the second refresh command as a second type of refresh command (1608). For example, based on internal state, memory, and/or a finite state machine, memory device 120 may elect to treat the second REF command as a REF2 command and determine a REF2 type refresh operation should be performed. In another example, memory device 120 may decode the second REF command to determine a REF2 type refresh operation should be performed.

Based on receiving the first refresh command, a first row to refresh is selected from a first sequence of rows that include all rows of a bank (1610). For example, based on the first REF command that was determined to be treated, or was decoded, as a REF1 command, memory device 120 may select a row to refresh that was selected from all of the rows of a bank. Based on receiving the second refresh command, a second row to refresh is selected from a second sequence of rows that is limited to a proper subset of all rows of the bank (1612). For example, based on the second REF command that was determined to be treated, or was decoded, as a REF2 command, memory device 120 may select a row to refresh based on the value of the flag in map 128 associated with the row in memory.

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of memory system 100, memory array 400, flag-bit circuitry 500, memory array 600, row select chain 700, memory system 1400, and their components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 17:
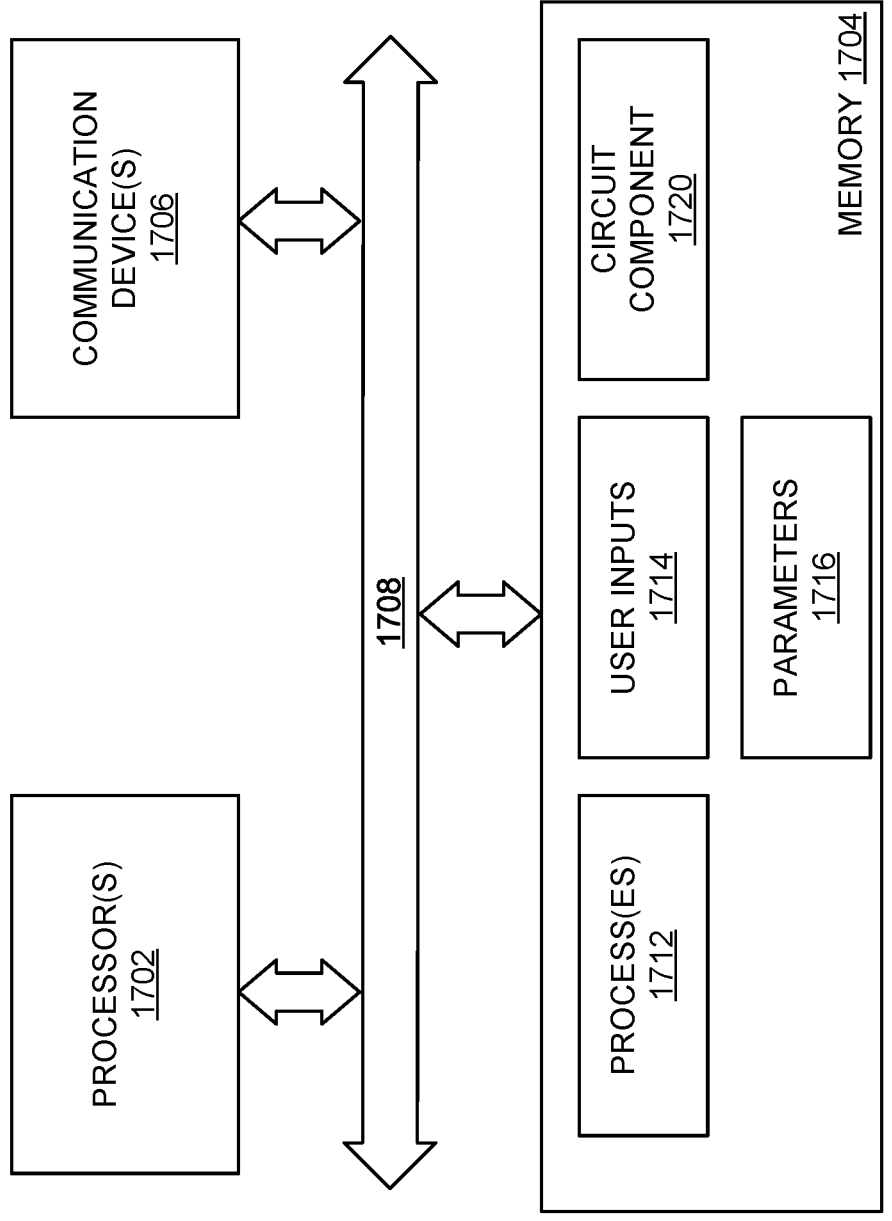
FIG. 17 is a block diagram of a processing system.

FIG. 17 is a block diagram illustrating one embodiment of a processing system 1700 for including, processing, or generating, a representation of a circuit component 1720. Processing system 1700 includes one or more processors 1702, a memory 1704, and one or more communications devices 1706. Processors 1702, memory 1704, and communications devices 1706 communicate using any suitable type, number, and/or configuration of wired and/or wireless connections 1708.

Processors 1702 execute instructions of one or more processes 1712 stored in a memory 1704 to process and/or generate circuit component 1720 responsive to user inputs 1714 and parameters 1716. Processes 1712 may be any suitable electronic design automation (EDA) tool or portion thereof used to design, simulate, analyze, and/or verify electronic circuitry and/or generate photomasks for electronic circuitry. Representation 1720 includes data that describes all or portions of memory system 100, memory array 400, flag-bit circuitry 500, memory array 600, row select chain 700, memory system 1400, and their components, as shown in the Figures.

Representation 1720 may include one or more of behavioral, register transfer, logic component, transistor, and layout geometry-level descriptions. Moreover, representation 1720 may be stored on storage media or communicated by carrier waves.

Data formats in which representation 1720 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email User inputs 1714 may comprise input parameters from a keyboard, mouse, voice recognition interface, microphone and speakers, graphical display, touch screen, or other type of user interface device. This user interface may be distributed among multiple interface devices. Parameters 1716 may include specifications and/or characteristics that are input to help define representation 1720. For example, parameters 1716 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 1704 includes any suitable type, number, and/or configuration of non-transitory computer-readable storage media that stores processes 1712, user inputs 1714, parameters 1716, and circuit component 1720.

Communications devices 1706 include any suitable type, number, and/or configuration of wired and/or wireless devices that transmit information from processing system 1700 to another processing or storage system (not shown) and/or receive information from another processing or storage system (not shown). For example, communications devices 1706 may transmit circuit component 1720 to another system. Communications devices 1706 may receive processes 1712, user inputs 1714, parameters 1716, and/or circuit component 1720 and cause processes 1712, user inputs 1714, parameters 1716, and/or circuit component 1720 to be stored in memory 1704.

Implementations discussed herein include, but are not limited to, the following examples:

Example 1: A dynamic random access memory (DRAM) device, comprising: a command interface to receive a refresh command; circuitry to determine, in response to the refresh command, whether to perform a selected one of a first type of refresh operation and a second type of refresh operation; a plurality of indicator bits each associated with a respective one of a plurality of groups of wordlines each comprising a plurality of wordlines; to maintain data retention, during a span of a selected number of refresh periods: the command interface to receive a total number of the refresh command; the DRAM to perform a first number of the first type of refresh operation; the DRAM to perform a second number of the second type of refresh operation; the second number based on a third number of the plurality of indicator bits that are set to a first value, the second number to be less than the first number; and, wordline address generation circuitry to progressively select respective ones of the plurality of groups of wordlines, in response to the first type of refresh operation and in a first internally generated sequence, and to progressively select, in response to the second type of refresh operation and in a second internally generated sequence, respective ones of the plurality of groups of wordlines associated with respective indicator bits being set to the first value.

Example 2: The DRAM device of example 1, wherein, during a current refresh period, if additional ones of the second type of refresh command are initiated after the second internally generated sequence completes during the current refresh period and before a next refresh period begins, the initiation of the additional ones of the second type of refresh command do not result in a refresh operation.

Example 3: The DRAM device of example 1, wherein the first number is based on a number of wordlines in the DRAM device.

Example 4: The DRAM device of example 1, wherein the plurality of indicator bits are set to one of the first value and a second value during an initialization of the DRAM device.

Example 5: The DRAM device of example 1, wherein first internally generated sequence proceeds independent of values of the plurality of indicator bits.

Example 6: The DRAM device of example 1, wherein the command interface is to also receive one or more commands that sets a value of at least one of the plurality of indicator bits based on a row address.

Example 7: The DRAM device of example 1, wherein each of the plurality of groups of wordlines are responsive to a respective one of a plurality of master wordlines.

Example 8: The DRAM device of example 7, wherein each of the plurality of indicator bits is stored in a respective wordline slice that drives the respective one of the plurality of master wordlines.

Example 9: A dynamic random access memory (DRAM) device, comprising: a plurality of master wordline refresh interval flags each associated with a respective one of a plurality of master wordlines that are activated during refresh operations; a command interface to receive at least a refresh command; circuitry to, in response to the refresh command, treat the refresh command as a one of a first type of refresh command or a second type of refresh command, the first type of refresh command to be used to activate all of the plurality of master wordlines thereby refreshing all rows of a bank, the second type of refresh command to be used to activate a subset of the master wordlines thereby refreshing a corresponding subset of rows of the bank, the subset to be determined by values of the plurality of master wordline refresh interval flags; first refresh cycle interval address generation circuitry to, in response to a first plurality of the refresh commands treated as the first type of refresh command that are received over a first time interval, generate first refresh cycle interval addresses to refresh all rows of the bank; and, second refresh cycle interval address generation circuitry to, in response to a second plurality of refresh commands treated as the second type of refresh command that are received over the first time interval, generate second refresh cycle interval addresses to refresh a subset of rows of the bank.

Example 10: The DRAM device of example 9, wherein the second refresh cycle interval address generation circuitry is to, in response to the second plurality of the refresh commands treated as the second type of refresh command that are received over the first time interval, generate second refresh cycle interval addresses to refresh the subset of rows of the bank more than once.

Example 11: The DRAM device of example 9, wherein the command interface is to receive at least one command to set at least one of the plurality of master wordline refresh interval flags.

Example 12: The DRAM device of example 11, wherein the command to set at least one of the plurality of master wordline refresh interval flags is not performed based on a DRAM device selection indicator.

Example 13: The DRAM device of example 12, further comprising: a data interface to receive the DRAM device selection indicator.

Example 14: The DRAM device of example 9, wherein the second refresh cycle interval address generation circuitry is to, in response to a third plurality of the refresh commands treated as the second type of refresh command that is in excess of the second plurality of the refresh commands treated as the second type of refresh command that received over the first time interval, not refresh rows of the bank.

Example 15: The DRAM device of example 9, wherein the first refresh cycle interval address generation circuitry generates first refresh cycle interval addresses that are responsive to refresh modes that include at least one of, but are not limited to, all bank refresh, fine granularity all bank refresh, same bank refresh, and single bank refresh.

Example 16: A method of operating a dynamic random access memory (DRAM) device, comprising: receiving, via a command interface, a first refresh command; determining to treat the first refresh command as a first type of refresh command; receiving, via the command interface, a second refresh command; determining to treat the second refresh command as a second type of refresh command; based on receiving the first refresh command, select a first row to refresh from a first sequence of rows that include all rows of a bank; and, based on receiving the second refresh command, select a second row to refresh from a second sequence of rows that is limited to a proper subset of all rows of the bank.

Example 17: The method of example 16, further comprising: receiving a plurality of row refresh indicators that determine the proper subset of all rows of the bank.

Example 18: The method of example 17, further comprising: receiving a DRAM device select indicator that determines whether the plurality of row refresh indicators are stored by the DRAM device.

Example 19: The method of example 16, further comprising: refreshing all rows of the bank in the first sequence of rows within a first refresh cycle interval; and, in addition to refreshing all rows of the bank in the first sequence of rows within a first refresh cycle interval, refreshing all of the proper subset of all rows of the bank in the second sequence of rows within the first refresh cycle interval.

Example 20: The method of example 19, further comprising: not performing refresh commands determined to be an excess amount of refresh commands to be treated as the second type of refresh command.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A dynamic random access memory (DRAM) device, comprising:
   a command interface to receive a refresh command;
   circuitry to determine, in response to the refresh command, whether to perform a selected one of a first type of refresh operation and a second type of refresh operation;
   a plurality of indicator bits each associated with a respective one of a plurality of groups of wordlines that are activated during refresh operations, each of the plurality of groups of wordlines comprising a plurality of wordlines;
   to maintain data retention, during a span of a selected number of refresh periods:
      the command interface to receive a total number of the refresh command;
      the DRAM to perform a first number of the first type of refresh operation;
      the DRAM to perform a second number of the second type of refresh operation;
      the second number based on a third number of the plurality of indicator bits that are set to a first value, the second number to be less than the first number; and,
      wordline address generation circuitry to progressively select respective ones of the plurality of groups of wordlines, in response to the first type of refresh operation and in a first internally generated sequence, and to progressively select, in response to the second type of refresh operation and in a second internally generated sequence, respective ones of the plurality of groups of wordlines associated with respective indicator bits being set to the first value.

2. The DRAM device of claim 1, wherein, during a current refresh period, if additional ones of the second type of refresh command are initiated after the second internally generated sequence completes during the current refresh period and before a next refresh period begins, the initiation of the additional ones of the second type of refresh command do not result in a refresh operation.

3. The DRAM device of claim 1, wherein the first number is based on a number of wordlines in the DRAM device.

4. The DRAM device of claim 1, wherein the plurality of indicator bits are set to one of the first value and a second value during an initialization of the DRAM device.

5. The DRAM device of claim 1, wherein first internally generated sequence proceeds independent of values of the plurality of indicator bits.

6. The DRAM device of claim 1, wherein the command interface is to also receive one or more commands that sets a value of at least one of the plurality of indicator bits based on a row address.

7. The DRAM device of claim 1, wherein each of the plurality of groups of wordlines are responsive to a respective one of a plurality of master wordlines.

8. The DRAM device of claim 7, wherein each of the plurality of indicator bits is stored in a respective wordline slice that drives the respective one of the plurality of master wordlines.

9. A dynamic random access memory (DRAM) device, comprising:
   a plurality of master wordline refresh interval flags each associated with a respective one of a plurality of master wordlines that are activated during refresh operations;

a command interface to receive at least a refresh command;

circuitry to, in response to the refresh command, treat the refresh command as a one of a first type of refresh command or a second type of refresh command, the first type of refresh command to be used to activate all of the plurality of master wordlines thereby refreshing all rows of a bank, the second type of refresh command to be used to activate a subset of the master wordlines thereby refreshing a corresponding subset of rows of the bank, the subset to be determined by values of the plurality of master wordline refresh interval flags;

first refresh cycle interval address generation circuitry to, in response to a first plurality of the refresh commands treated as the first type of refresh command that are received over a first time interval, generate first refresh cycle interval addresses to refresh all rows of the bank; and, second refresh cycle interval address generation circuitry to, in response to a second plurality of refresh commands treated as the second type of refresh command that are received over the first time interval, generate second refresh cycle interval addresses to refresh a subset of rows of the bank.

10. The DRAM device of claim 9, wherein the second refresh cycle interval address generation circuitry is to, in response to the second plurality of the refresh commands treated as the second type of refresh command that are received over the first time interval, generate second refresh cycle interval addresses to refresh the subset of rows of the bank more than once.

11. The DRAM device of claim 9, wherein the command interface is to receive at least one command to set at least one of the plurality of master wordline refresh interval flags.

12. The DRAM device of claim 11, wherein the command to set at least one of the plurality of master wordline refresh interval flags is not performed based on a DRAM device selection indicator.

13. The DRAM device of claim 12, further comprising:
a data interface to receive the DRAM device selection indicator.

14. The DRAM device of claim 9, wherein the second refresh cycle interval address generation circuitry is to, in response to a third plurality of the refresh commands treated as the second type of refresh command that is in excess of the second plurality of the refresh commands treated as the second type of refresh command that received over the first time interval, not refresh rows of the bank.

15. The DRAM device of claim 9, wherein the first refresh cycle interval address generation circuitry generates first refresh cycle interval addresses that are responsive to refresh modes that include at least one of, but are not limited to, all bank refresh, fine granularity all bank refresh, same bank refresh, and single bank refresh.

16. A method of operating a dynamic random access memory (DRAM) device, comprising:
receiving a plurality of refresh interval flags each associated with a respective one of a plurality of wordlines that are activated during refresh operations, the plurality of refresh interval flags determining a proper subset of all rows of a bank;
receiving, via a command interface, a first refresh command;
determining to treat the first refresh command as a first type of refresh command;
receiving, via the command interface, a second refresh command;
determining to treat the second refresh command as a second type of refresh command;
based on receiving the first refresh command, select a first row to refresh from a first sequence of rows that include all rows of the bank; and,
based on receiving the second refresh command, select a second row to refresh from a second sequence of rows that is limited to the proper subset of all rows of the bank.

17. The method of claim 16, wherein the determining to treat the first refresh command as the first type of refresh command and the determining to treat the second refresh command as the second type of refresh command are based on a ratio of a first plurality of previous commands treated as the first type of refresh command to a second plurality of previous commands treated as the second type of refresh command.

18. The method of claim 17, further comprising:
receiving a DRAM device select indicator that determines whether the plurality of row refresh indicators are stored by the DRAM device.

19. The method of claim 16, further comprising:
refreshing all rows of the bank in the first sequence of rows within a first refresh cycle interval; and,
in addition to refreshing all rows of the bank in the first sequence of rows within a first refresh cycle interval, refreshing all of the proper subset of all rows of the bank in the second sequence of rows within the first refresh cycle interval.

20. The method of claim 19, further comprising:
not performing refresh commands determined to be an excess amount of refresh commands to be treated as the second type of refresh command.

* * * * *